United States Patent
Quere et al.

(10) Patent No.: US 10,151,639 B2
(45) Date of Patent: *Dec. 11, 2018

(54) DEVICE AND METHOD FOR CHARACTERIZATION OF A LIGHT BEAM TO DETERMINE THE SPATIAL-TEMPORAL PROPERTIES OF THE LIGHT BEAM USING A TWO DIMENSIONAL INTERFERENCE PATTERN

(71) Applicant: COMMISSARIAT À L'ÉNERGIE ATOMIQUE ET AUX ÉNERGIES ALTERNATIVES, Paris (FR)

(72) Inventors: Fabien Quere, Vélizy-Villacoublay (FR); Valentin Gallet, Epinay sur Orge (FR); Gustave Pariente, Paris (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/319,204

(22) PCT Filed: Jun. 15, 2015

(86) PCT No.: PCT/EP2015/063368
§ 371 (c)(1),
(2) Date: Apr. 5, 2017

(87) PCT Pub. No.: WO2015/193254
PCT Pub. Date: Dec. 23, 2015

(65) Prior Publication Data
US 2017/0205292 A1    Jul. 20, 2017

(30) Foreign Application Priority Data
Jun. 16, 2014 (FR) ..................... 14 55472

(51) Int. Cl.
*G01J 11/00* (2006.01)
*G01J 9/02* (2006.01)
*G01J 3/453* (2006.01)

(52) U.S. Cl.
CPC ............... *G01J 11/00* (2013.01); *G01J 3/453* (2013.01); *G01J 9/0215* (2013.01); *G01J 2003/4538* (2013.01)

(58) Field of Classification Search
CPC ........... G01J 11/00; G01J 3/453; G01J 9/0215
See application file for complete search history.

(56) References Cited

U.S. PATENT DOCUMENTS

2003/0025911 A1* 2/2003 Walmsley ............... G01J 11/00
356/450

FOREIGN PATENT DOCUMENTS

FR        2 976 663 A1   12/2012
WO    WO 2012/172463 A1  12/2012

OTHER PUBLICATIONS

International Search Report as issued in International Patent Application No. PCT/EP2015/063368, dated Oct. 15, 2015.
Alonso, B., et al., "Frequency resolved wavefront retrieval and dynamics of diffractive focused ultrashort pulses," Journal of the Optical Society of America—B, vol. 29, No. 8, Aug. 1, 2012, XP007923042, ISSN: 0740-3224, pp. 1993-2000.
(Continued)

*Primary Examiner* — Hwa Lee
(74) *Attorney, Agent, or Firm* — Pillsbury Winthrop Shaw Pittman LLP

(57) ABSTRACT

A method for characterizing a light beam includes separating the light beam by a separator optic into first and second sub-beams; propagating the first and second sub-beams over first and second optics, respectively, said first and second optics being respectively arranged so that the sub-beams on leaving the optics are separated by a time delay τ; recombining the sub-beams so that they spatially interfere and form a two-dimensional interference pattern; measuring the frequency spectrum of at least part of the interference (Continued)

pattern; calculating the Fourier transform in the time domain of at least one spatial point of the frequency spectrum, the Fourier transform in the time domain having a time central peak and first and second time side peaks; calculating the Fourier transform in the frequency domain for one of the side peaks; calculating the spectral amplitude $A_R(\omega)$ and the spatial-spectral phase $\varphi_R(x,y,\omega)$ for the Fourier transform in the frequency domain.

10 Claims, 15 Drawing Sheets

(56) References Cited

OTHER PUBLICATIONS

Oksenhendler, T., et al., "Self-referenced spectral interferometry," Applied Physics B; Lasers and Optics, vol. 99, No. 1-2, Feb. 6, 2010, XP019801509, ISSN:1432-0649, pp. 7-12.

Cousin, S. L., et al., "Three-dimensional spatiotemporal pulse characterization with an acousto-optic pulse shaper and a Hartmann-Shack wavefront sensor," Optics Letters, vol. 37, No. 15, Aug. 1, 2012, pp. 3291-3293.

Notice of Allowance as issued in U.S. Appl. No. 15/319,267, dated Jun. 20, 2018.

* cited by examiner

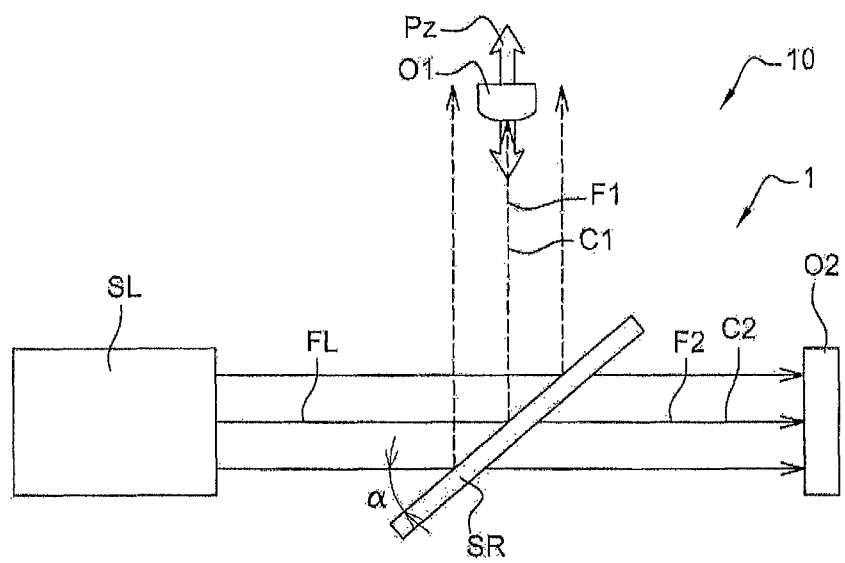
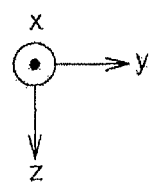
Fig. 2a
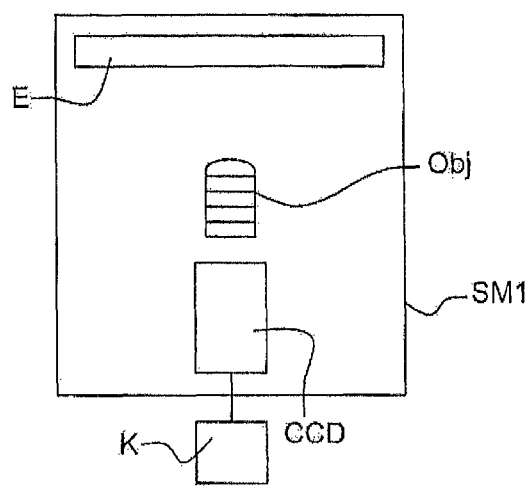

DEVICE AND METHOD FOR CHARACTERIZATION OF A LIGHT BEAM TO DETERMINE THE SPATIAL-TEMPORAL PROPERTIES OF THE LIGHT BEAM USING A TWO DIMENSIONAL INTERFERENCE PATTERN

CROSS-REFERENCE TO RELATED APPLICATIONS

This is the U.S. National Stage of PCT/EP2015/063368, filed Jun. 15, 2015, which in turn claims priority to French Application No. 1455472, filed Jun. 16, 2014, the entire contents of all applications are incorporated herein by reference in their entireties.

TECHNICAL FIELD OF THE INVENTION

The technical field of the invention is that of optical metrology.

One aspect of the present invention thus relates to a device and a method for characterization of a light beam, in particular a polychromatic light beam, and notably a polychromatic laser beam. The device and the method according to one aspect of the invention make it possible in particular to determine the spatial-temporal properties of a light beam and notably a pulsed laser beam, comprising one or more laser pulses of typically femtosecond duration. More generally, the device and the method according to one aspect of the invention may be used to measure cross-correlation functions between the electromagnetic field at one point of the light beam, qualified as reference point, and the electromagnetic fields at all the other points of the light beam.

TECHNOLOGICAL BACKGROUND OF THE INVENTION

The invention will be described more particularly in relation to its applications to the characterization of ultrashort laser pulses having space-time couplings, even though these uses are not exclusive. "Ultrashort laser pulse" is taken to mean a picosecond pulse, that is to say of duration comprised between around 0.1 and 100 ps, or a femtosecond pulse, that is to say of duration less than or equal to 100 fs=0.1 ps. The durations extend to mid-height of the intensity profile. These pulses have a relative wide spectral band, that is to say typically of the order of several tens of nanometers, or even of the order of several hundreds of manometers.

Ultrashort laser pulses have numerous scientific and technological applications; they can be amplified up to energies of several joules and form beams, referred to as "pulsed beams", the diameter of which goes from several millimeters to several centimeters as a function, notably, of their power.

Generally speaking, the temporal properties of the electromagnetic field of a pulsed beam can vary spatially or, in an equivalent manner, the spatial properties of the electromagnetic field of a pulsed beam may be time dependent. For example, the pulse duration may depend on the position (x,y) in the beam. In the present description, unless stated otherwise, a beam propagating in a direction "z" will be considered, the "x", "y" and "z" axes forming an orthonormal coordinate system.

When such a dependency exists, the field $E(x,y,t)$ cannot be expressed in the form:

$$E(x,y,t)=E_1(t) \times E_2(x,y)$$

where $E_1(t)$ is a time function and $E_2(x,y)$ a space function. It is then said that the beam has space-time coupling (STC).

Space-time couplings may lead notably to distortion of the intensity front of a pulsed beam, illustrated by means of FIGS. 1a and 1b. FIG. 1a illustrates the ideal case, according to which the electromagnetic energy of an ultrashort pulsed beam propagating in the direction z is spread out in a very thin disc of diameter D and of thickness cT, where c is the speed of light and T the duration of the pulse. In the example of FIG. 1a, D=8 cm and cT=10 μm, which corresponds to a pulse duration of around 33 fs. In order to maximize the light intensity obtained at the focus, which is generally desired, said disc must be as "flat" as possible. To characterize this spatial distribution of the energy, the expression "intensity front" of the laser is used. The notion of intensity front must not be confused with that of "wave front".

In practice, and notably in the case of high power lasers with large beam diameter, the intensity fronts may not be flat but distorted, as illustrated in FIG. 1b. Consequently, the pulse peak may be reached at different instants in the different points of the section of the beam in the plane (x,y), and the pulse duration may also vary from one point to another. Other types of space-time couplings are also possible, such as for example a rotation of the wave fronts over time.

Techniques for measuring these couplings have been proposed, but they remain limited in their performances, are complex to implement and are unsuited to large size beams, typically coming from high power sources. Consequently, these techniques are not widespread. In fact, the larger a light beam, the more likely it is to have space-time coupling. It is thus in particular for such light beams that it is important to be able to carry out a measurement of space-time couplings.

These techniques are listed hereafter.

The "SPIDER-2D" technique, costly and complex, imposes a limitation of the size of the characterized beam. SPIDER-2D enables the reconstruction of the characterized beam as a function of time t and a transversal direction, x or y.

The "STRIPED FISH" technique is simpler to implement and cheaper than SPIDER-2D. STRIPED FISH moreover enables the reconstruction of the characterized beam as a function of time t and two transversal directions x and y. Nevertheless, STRIPED FISH also imposes a limitation of the size of the characterized beam, requires the use of a reference beam, which can prove very difficult to obtain, and only enables small spectral sampling.

The "HAMSTER" technique is described in the article of Cousin et al., "Three-dimensional spatiotemporal pulse characterization with an acousto-optic pulse shaper and a Hartmann-Shack wavefront sensor", Optics Letters 37, 3291 (2012). HAMSTER uses an acoustic-optic modulator and a 2D wave front sensor of Shack-Hartmann type in order to carry out a time measurement at a point of the characterized beam, then to measure the spatial wave front of different spectral sections of the characterized beam. At the end of two series of measurements, HAMSTER arrives at a complete space-time reconstruction of the characterized beam, that is to say as a function of time t and two transversal directions x and y. The HAMSTER technique nevertheless involves a certain complexity and a high cost, on account notably of the use of an acoustic-optic modulator. On the other hand, the HAMSTER technique is unsuitable for large diameter beams.

The "SEA TADPOLE" technique consists in collecting light at different points of the characterized beam with a first optical fibre, while moving said first optical fibre to the different points of the beam. An auxiliary beam is injected into a second optical fibre. The output ends of the first and second optical fibres are placed close to each other, in such a way that in diverging, the beams leaving said first and second optical fibres overlap spatially and produce spatial interferences. These spatial interferences are spectrally resolved using a spectrometer, to obtain an interferogram. This interferogram makes it possible to determine the spectral phase between the beam injected into the first fibre, and that injected into the second fibre. The spectral properties of the light collected at a point of the characterized beam are thus compared with those of the auxiliary beam. By moving the first fibre to a plurality of points of the characterized beam, each of these points is compared with the auxiliary beam, which makes it possible to reconstruct the spectral phase of the characterized beam. Unlike the SPIDER-2D and STRIPED FISH techniques, the SEA TADPOLE technique has the advantage of not limiting the size of the characterized beam. In the same way as for STRIPED FISH, the mounting is relatively simple and inexpensive and the reconstruction of the characterized beam is carried out according to three dimensions (x, y, t). However, the characterization of a beam by SEA TADPOLE requires a large number of laser shots, the spectral phase being determined point by point. The necessity of carrying out several laser shots imposes that the laser beam to characterize is stable and reproducible shot-to-shot, which is not always the case for femtosecond lasers, and in particular for high power femtosecond lasers. Another limitation of the SEA TADPOLE technique is constituted by the use of optical fibres, which introduce random phase fluctuations.

The closest state of the art is constituted by the technique referred to as "MUFFIN", which is described in the patent FR 2976663 (A1). The SPIDER-2D, STRIPED FISH and SEA TADPOLE techniques evoked previously are also described in a detailed manner in the preamble of patent FR 2976663(A1). The MUFFIN technique represents an improvement to the SEA TADPOLE technique. Instead of using two optical fibres—a first optical fibre that is moved successively to N points of the characterized beam and a second optical fibre that serves as reference, MUFFIN proposes using directly a set of N optical fibres. The input ends of these N fibres collect light at N different points of the characterized beam. The output ends of these N fibres are placed next to each other in a line, so that the beams on leaving said fibres overlap and spatially interfere with each other. The MUFFIN technique thus arrives, in a single shot and without necessarily having available an auxiliary beam, at the result of SEA TADPOLE. MUFFIN does not eliminate straight away the problem of phase fluctuation in the optical fibres, already identified for SEA TADPOLE. Such phase fluctuations may prevent complete reconstruction of the characterized beam. A solution to this problem has been proposed in the patent cited above, but it makes the use of the MUFFIN technique more complex. Furthermore, it is difficult with the MUFFIN technique to use a large number of optical fibres. In practice, the maximum number of optical fibres is of the order of several tens. Consequently, the MUFFIN technique only enables a limited spatial sampling of the characterized beam.

SUMMARY OF THE INVENTION

The invention thus aims to offer a solution to the aforementioned problems, by proposing a device and a method for characterization of a light beam suited for a large size light beam and enabling complete reconstruction of said light beam with good spatial sampling and good spectral sampling, while remaining relatively simple and inexpensive to implement.

One aspect of the invention thus relates to a device for characterization of a light beam comprising:
- a separator optic for the separation of the light beam into a first sub-beam and a second sub-beam, the separator optic defining a first optical path for the first sub-beam and a second optical path for the second sub-beam;
- a first optic arranged in the first optical path, the first optic having a first radius of curvature so that the first sub-beam on leaving the first optic, referred to as "reference beam", has wave fronts of a first type;
- a second optic arranged in the second optical path, the second optic having a second radius of curvature different to the first radius of curvature so that the second sub-beam on leaving the second optic, referred to as "characterized beam", has wave fronts of a second type, different to the first type;
- a means of controlling a time delay $\tau$ between the reference beam and the characterized beam;
- a recombiner optic for the recombination of the reference beam and the characterized beam in such a way that the beams spatially interfere and form a two-dimensional interference pattern;
- a measuring system making it possible to obtain, from at least the two-dimensional interference pattern, a temporal information or a frequency information;
- a calculator enabling the calculation from the temporal information of a Fourier transform in the frequency domain, or the calculation from the frequency information of a Fourier transform in the temporal domain.

Thanks to the invention, advantageously a part, considered as being a point source, of the first sub-beam is used in order to generate a reference beam of large size making it possible to characterize the whole of the characterized beam. "Reference beam of large size" is taken to mean the fact that, in a desired measuring plane, the size of the reference beam is greater than or equal to the size of the characterized beam. Thanks to the difference in radius of curvature between the first and second optics, the wave fronts of the reference beam are of the first type and the wave fronts of the characterized beam are of the second type, the second type being different to the first type. The type of wave front is notably determined as a function of the radius of curvature of said wave front.

Thus, in the desired measuring plane, the reference beam considered as coming from a point source spatially interferes with each point of the characterized beam. A characterization of the characterized beam is thus obtained, relatively to the reference beam, said reference beam being obtained in a simple, efficient and inexpensive manner.

Apart from the characteristics that have been mentioned in the preceding paragraph, the device for characterization of a light beam according to one aspect of the invention may have one or more complementary characteristics among the following, considered individually or according to any technically possible combinations thereof.

The separator optic and the recombiner optic form a single and same optic ensuring the separation of the light beam on the one hand, and the recombination of the reference beam and the characterized beam on the other hand.

The calculator is a calculator of Fourier transform between temporal and frequency type information which, from the information of one of these types, calculates the Fourier transform of the other type.

Another aspect of the invention relates to a first method for characterization of a light beam using the device for characterization of a light beam according to one aspect of the invention, the first method comprising the following steps:

- separation of the light beam by means of the separator optic into the first sub-beam and the second sub-beam, the first sub-beam taking the first optical path and the second sub-beam taking the second optical path;
- propagation of the first sub-beam over the first optic and of the second sub-beam over the second optic, said first and second optics being, thanks to the control means, respectively arranged in the first and second optical paths so that the first sub-beam on leaving the first optic, referred to as "reference beam", and the second sub-beam on leaving the second optic, referred to as "characterized beam", are separated by a time delay $\tau$ sweeping a time interval T1 with a step P1;
- recombination of the reference beam and of the characterized beam by means of the recombiner optic in such a way that the beams spatially interfere and form a two-dimensional interference pattern;
- measurement of said two-dimensional interference pattern by means of the measuring system as a function of the time delay $\tau$ sweeping the time interval T1 with the step P1 between the reference beam and the characterized beam, to obtain a temporal interferogram;
- calculation, by means of the calculator, of the Fourier transform in the frequency domain of at least one spatial point of the temporal interferogram, said Fourier transform in the frequency domain having a central frequency peak and first and second frequency side peaks.
- calculation, by means of the calculator, of the spectral amplitude $A_R(\omega)$, referred to as "relative spectral amplitude", and the spatial-spectral phase $\varphi_R(x,y,\omega)$, referred to as "relative spatial-spectral phase", for one of said first and second frequency side peaks of said Fourier transform in the frequency domain.

In the present description, "temporal interferogram" is taken to mean all of the two-dimensional interference patterns for each time delay $\tau$ sweeping the time interval T1 with the step P1. The temporal interferogram thus comprises three-dimensional information, along two spatial dimensions and one temporal dimension. The first method for characterization of a light beam according to one aspect of the invention enables excellent spatial sampling of the characterized beam. Thanks to the sweeping by the time delay $\tau$ of the time interval T1 with a step P1, the first method for characterization of a light beam according to one aspect of the invention enables excellent spectral sampling of the characterized beam. The quality of the spectral sampling is in fact linked to the length of the time interval T1 which scans the time delay $\tau$.

Apart from the characteristics that have been mentioned in the preceding paragraph, the first method for characterization of a light beam according to one aspect of the invention may have one or more additional characteristics among the following, considered individually or according to any technically possible combinations thereof.

The first method comprises, for at least one time delay $\tau$ sweeping the time interval T1 with the step P1, a step of calculation by the calculator of the intensity and the spatial distribution of the intensity of the characterized beam. Said step advantageously makes it possible to take into account potential fluctuations of the properties of the light source over time, that is to say typically from one pulse to the other in the case of a pulsed light source. Potential fluctuations of the intensity and the spatial distribution of the intensity of the light source during the sweeping time interval T1 are in fact capable of degrading the measured two-dimensional interference patterns, and thus the complex spectra that are deduced therefrom.

Preferentially, the first method comprises, for each time delay $\tau$ sweeping the time interval T1 with the step P1, said step of calculation by the calculator of the intensity and the spatial distribution of the intensity of the characterized beam.

The first method advantageously comprises:
- a step of measuring the spatial phase at a frequency $\omega_0$ of the reference beam $\varphi_{ref}(x,y,\omega_0)$, said spatial phase $\varphi_{ref}(x,y,\omega_0)$ being characteristic of the curvature of the wave front of the reference beam introduced by the first optic,
- then a step of subtraction of the spatial-spectral phase $$\frac{\omega}{\omega_0} \varphi_{ref}(x, y, \omega_0)$$

from the relative spatial-spectral phase $\varphi_R(x,y,\omega)$, to obtain the corrected relative spatial-spectral phase of the characterized beam.

Thus, the curvature of the wave front of the reference beam that is introduced by the first optic is taken into account.

According to a first alternative, the first method advantageously comprises:
- a step of measuring the spatial-spectral phase of the first sub-beam $\varphi_{ref}(x,y,\omega)$, referred to as "reference spatial-spectral phase",
- then a step of subtraction of said reference spatial-spectral phase $\varphi_{ref}(x,y,\omega)$ from the relative spatial-spectral phase $\varphi_R(x,y,\omega)$, to obtain the absolute spatial-spectral phase of the characterized beam $\varphi_{abs}(x, y,\omega)$.

Thus, an absolute characterization of the characterized beam is obtained, independently of the reference beam.

According to a second alternative, the first method advantageously comprises:
- a step of measuring the spatial phase at a frequency $\omega_0$ of the reference beam $\varphi_{ref}(x,y,\omega_0)$, said spatial phase $\varphi_{ref}(x,y,\omega_0)$ being characteristic of the curvature of the wave front of the reference beam introduced by the first optic,
- a step of measuring the spatial-spectral phase of the first sub-beam $\varphi_{ref}(x,y,\omega)$, referred to as "reference spatial-spectral phase",
- then a step of subtraction of said reference spatial-spectral phase $\varphi_{ref}(x,y,\omega)$ and spatial-spectral phase $$\frac{\omega}{\omega_0} \varphi_{ref}(x, y, \omega_0)$$

from the relative spatial-spectral phase $\varphi_R(x,y,\omega)$, to obtain the corrected absolute spatial-spectral phase of the characterized beam.

Thus, an absolute characterization of the characterized beam is obtained while correcting the curvature of the wave front of the reference beam that is introduced by the first optic.

The first method advantageously comprises a step of filtering the first sub-beam making it possible to increase the quality of said first sub-beam. This thus contributes to increasing the quality of the reference beam, which is derived from a part, assimilated with a point source, of the first sub-beam. The filtering step may be a step of linear filtering. The spatial properties of the first sub-beam are thus advantageously improved. Alternatively, the filtering step may be a step of non-linear filtering. The spectrum of the first sub-beam is thus advantageously spread out, and thus the reference beam which is the first sub-beam on leaving the first optic. By widening the spectrum of the reference beam, this advantageously eliminates at least partially the case where, before said filtering step, certain zones of the characterized beam comprise frequencies that are not in the spectrum of the reference beam. The filtering step may also comprise a first sub-step of linear filtering, and a second sub-step of non-linear filtering.

Another aspect of the invention concerns a second method for characterization of a light beam using the device for characterization of a light beam according to one aspect of the invention, the second method comprising the following steps:
separation of the light beam by means of the separator optic into the first sub-beam and the second sub-beam, the first sub-beam taking the first optical path and the second sub-beam taking the second optical path;
propagation of the first sub-beam over the first optic and of the second sub-beam over the second optic, said first and second optics being, thanks to the control means, respectively arranged in the first and second optical paths so that the first sub-beam on leaving the first optic, referred to as "reference beam" and the second sub-beam on leaving the second optic, referred to as "characterized beam", are separated by a time delay $\tau$;
recombination of the reference beam and the characterized beam by means of the recombiner optic in such a way that the beams spatially interfere and form a two-dimensional interference pattern, the two-dimensional interference pattern extending along a first plane;
measuring the frequency spectrum of at least one part of the two-dimensional interference pattern by means of the measuring system, the measuring system comprising a spectrometer having an inlet slit extending along a first spatial direction of the first plane;
calculation of the Fourier transform in the time domain of at least one spatial point of the frequency spectrum, said Fourier transform in the time domain having a time central peak and first and second time side peaks;
calculation, by means of the calculator, of the Fourier transform in the frequency domain for one of said first and second time side peaks;
calculation, by means of the calculator, of the spectral amplitude $A_R(\omega)$, referred to as "relative spectral amplitude", and the spatial-spectral phase $\varphi_R(x,y,\omega)$, referred to as "relative spatial-spectral phase", for said Fourier transform in the frequency domain.

The second method for characterization of a light beam according to one aspect of the invention advantageously makes it possible to eliminate potential fluctuations in the properties of the light source over time. In fact, said second method enables a measurement referred to as "single shot", that is to say which only uses a single light pulse in the case of a pulsed light source, or instead, in the case of a continuous light source, which only uses the light source for a very short duration, during which it is possible to consider that its properties do not fluctuate.

Apart from the characteristics that have been mentioned in the preceding paragraph, the second method for characterization of a light beam according to one aspect of the invention may have one or more additional characteristics among the following, considered individually or according to any technically possible combinations thereof.

The step of measuring the frequency spectrum of at least one part of the two-dimensional interference pattern comprises the following sub-steps:
arranging the spectrometer of the measuring system so that the inlet slit of the spectrometer is adapted to receive said at least one part of the two-dimensional interference pattern, said at least one part extending along the first spatial dimension of the first plane;
measuring, thanks to the spectrometer, the frequency spectrum of said at least one part of the two-dimensional interference pattern extending along the first spatial dimension of the first plane.

Alternatively, the step of measuring the frequency spectrum of at least one part of the two-dimensional interference pattern comprises the following sub-steps:
the measuring system comprising a plurality of optical fibres, arranging the input ends of said plurality of optical fibres in the first plane according to a two-dimensional matrix, so as to be able to sample the two-dimensional interference pattern along a first spatial direction of the first plane and along a second spatial direction of the first plane;
arranging the output ends of said plurality of optical fibres on the inlet slit of the spectrometer of the measuring system;
measuring, thanks to the spectrometer of the measuring system, the frequency spectrum of the sampling of the two-dimensional interference pattern along the first and second spatial directions of the first plane.

The second method advantageously comprises:
a step of measuring the spatial phase at a frequency $\omega_0$ of the reference beam $\varphi_{ref}(x,y,\omega_0)$, said spatial phase $\varphi_{ref}(x,y,\omega_0)$ being characteristic of the curvature of the wave front of the reference beam introduced by the first optic,
then a step of subtraction of the spatial-spectral phase $$\frac{\omega}{\omega_0}\varphi_{ref}(x,y,\omega_0)$$

from the relative spatial-spectral phase $\varphi_R(x,y,\omega)$, to obtain the corrected relative spatial-spectral phase of the characterized beam.

Thus, the curvature of the wave front of the reference beam that is introduced by the first optic is taken into account.

According to a first alternative, the second method advantageously comprises:

a step of measuring the spatial-spectral phase of the first sub-beam $\varphi_{ref}(x,y,\omega)$, referred to as "reference spatial-spectral phase", then a step of subtraction of said reference spatial-spectral phase $\varphi_{ref}(x,y,\omega)$ from the relative spatial-spectral phase $\varphi_R(x,y,\omega)$, to obtain the absolute spatial-spectral phase of the characterized beam $\varphi_{abs}(x,y,\omega)$.

Thus, an absolute characterization of the characterized beam is obtained, independently of the reference beam.

According to a second alternative, the second method advantageously comprises:

a step of measuring the spatial phase at a frequency $\omega_0$ of the reference beam $\varphi_{ref}(x,y,\omega_0)$, said spatial phase $\varphi_{ref}(x,y,\omega_0)$ being characteristic of the curvature of the wave front of the reference beam introduced by the first optic, a step of measuring the spatial-spectral phase of the first sub-beam $\varphi_{ref}(x,y,\omega)$, referred to as "reference spatial-spectral phase", then a step of subtraction of said reference spatial-spectral phase $\varphi_{ref}(x,y,\omega)$ and the spatial-spectral phase $$\frac{\omega}{\omega_0} \varphi_{ref}(x, y, \omega_0)$$

from the relative spatial-spectral phase $\varphi_R(x,y,\omega)$, to obtain the corrected absolute spatial-spectral phase of the characterized beam.

Thus, an absolute characterization of the characterized beam is obtained while correcting the curvature of the wave front of the reference beam that is introduced by the first optic.

The second method advantageously comprises a step of filtering the first sub-beam making it possible to increase the quality of said first sub-beam. This thus contributes to increasing the quality of the reference beam, which is derived from a part, assimilated with a point source, of the first sub-beam. The filtering step may be a step of linear filtering. The spatial properties of the first sub-beam are thus advantageously improved. Alternatively, the filtering step may be a step of non-linear filtering. The spectrum of the first sub-beam is thus advantageously spread out, and thus the reference beam which is the first sub-beam on leaving the first optic. By widening the spectrum of the reference beam, this thus advantageously eliminates, at least partially, the case where, before said filtering step, certain zones of the characterized beam comprise frequencies that are not in the spectrum of the reference beam. The filtering step may also comprise a first sub-step of linear filtering, and a second sub-step of non-linear filtering.

The invention and the different applications thereof will be better understood on reading the description that follows and by examining the figures that accompany it.

BRIEF DESCRIPTION OF THE FIGURES

The figures are presented for indicative purposes and in no way limit the invention.

FIG. 2a illustrates a first step of a method for characterization of a light beam according to a first embodiment of the invention, using a first device for characterization of a light beam.

FIG. 7b shows the appearance of the Fourier transform of the partial temporal interferogram of FIG. 7a.

DETAILED DESCRIPTION OF AT LEAST ONE EMBODIMENT OF THE INVENTION

Unless stated otherwise, a same element appearing in different figures has a single reference.

Figures 1A, 1B:
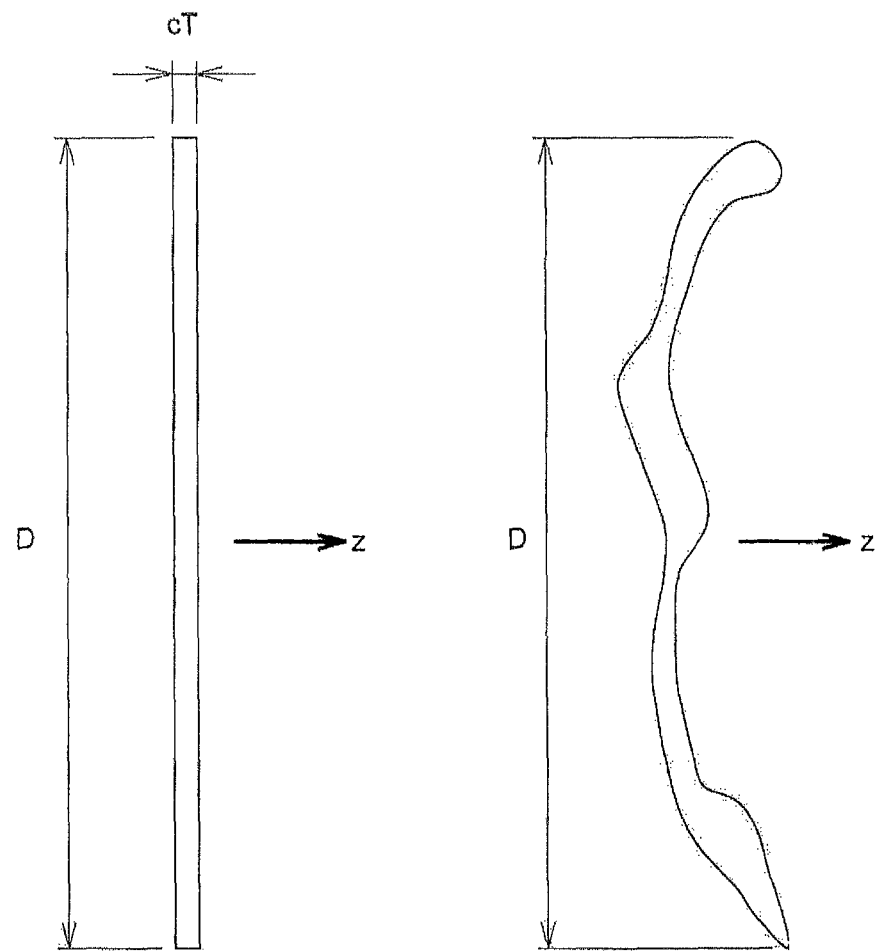
FIG. 1a illustrates an example of distribution of electromagnetic energy in an ultrashort pulsed laser beam, in an ideal case without space-time coupling.
FIG. 1b illustrates an example of distribution of electromagnetic energy in an ultrashort pulsed laser beam, in a non-ideal case with space-time coupling.

FIGS. 1a and 1b have been described previously.

Figure 2B:
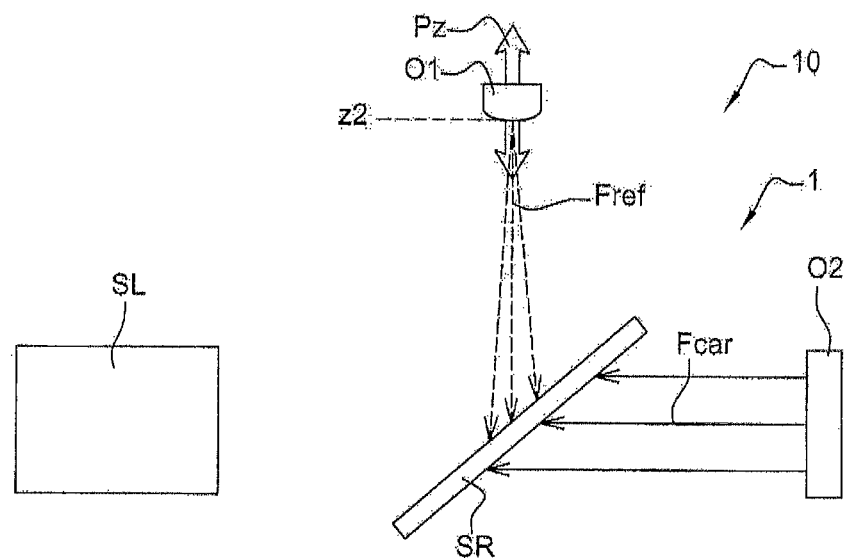
FIG. 2b illustrates a second step of the method for characterization of a light beam according to the first embodiment of the invention, using the first device for characterization of a light beam.
Figure 2B:
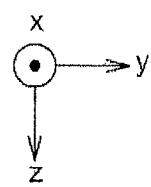
Figure 2B:
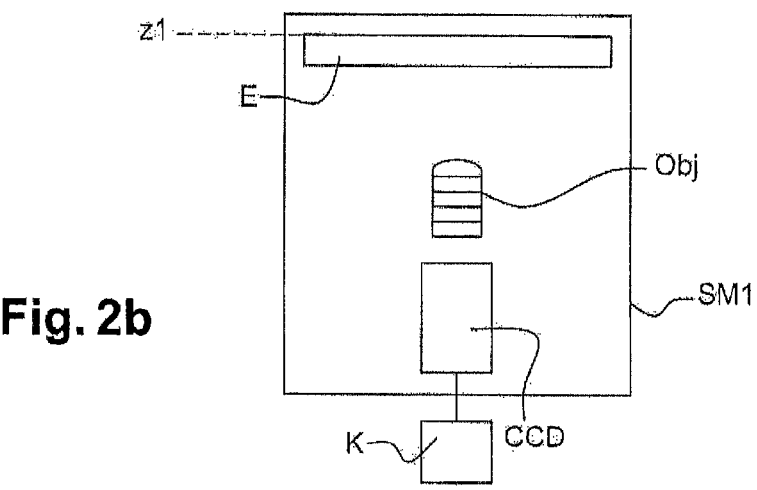
Figure 2C:
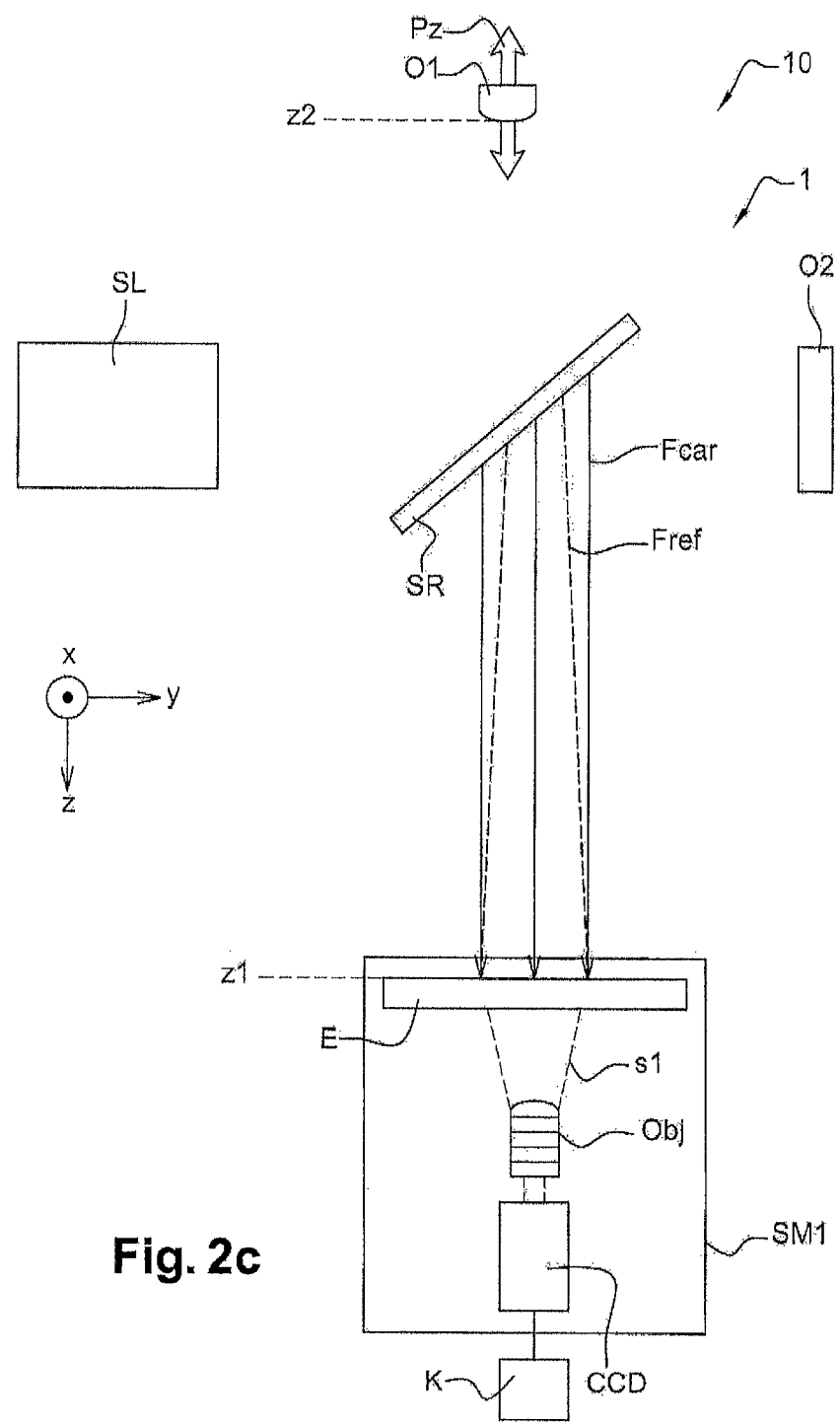
FIG. 2c illustrates a third step of the method for characterization of a light beam according to the first embodiment of the invention, using the first device for characterization of a light beam.

FIGS. 2a, 2b and 2c show respectively a first step a), a second step b) and a third step c) of a method 10 for characterization of a light beam according to a first embodiment of the invention. The first embodiment is also referred to as "multi-shot mode". A second embodiment, referred to as "one-shot mode" is described later.

According to the first embodiment of the invention, the method 10 uses a first device 1 for characterization of a light beam, which is represented in FIGS. 2a to 2c. The device 1 comprises:

- an optic SR;
- a first optic O1;
- a second optic O2;
- a means of controlling Pz a time delay τ;
- a measuring system SM1;
- and a calculator K.

In the example of embodiment that is particularly illustrated in FIGS. 2a to 2c, the first optic O1 and the second optic O2 are reflecting optics, such as mirrors. According to an alternative, not illustrated, the first optic O1 and/or the second optic O2 may also be optical lenses. In one or the other case, the first and second optics O1 and O2 have different radiuses of curvature. In the example of embodiment which is particularly illustrated in FIGS. 2a to 2c, the first optic O1 is a divergent optic, and more precisely a divergent mirror, whereas the second optic O2 is a flat optic, and more precisely a flat mirror. According to an alternative, not illustrated, the first optic O1 may be a convergent optic and/or the second optic O2 may be a divergent or convergent optic. A plurality of combinations may thus be envisaged for the first and second optics O1 and O2, in so far as the radius of curvature of the first optic O1 is different to the radius of curvature of the second optic O2.

Reference is made in the remainder of this description to an orthonormal system of centre O and of axes x, y and z, defining the planes Oxz, Oxy and Oyz.

During said first step a), illustrated in FIG. 2a, a light beam FL, generated by a light source SL, is sent to the optic SR. In the particular example of embodiment described herein, the light source SL is a pulsed femtosecond laser, capable of generating pulses of the order of 25 femtoseconds at a frequency of 10 Hz, each pulse having an energy of the order of 2.5 J. The peak power of this pulsed laser is of the order of 100 TW, whereas its average power reaches around 25 W. The light beam FL at the output of the light source SL is thus formed, in the example considered, by a succession of light pulses. The light beam FL has in the example considered a diameter of the order of 80 mm. Generally speaking, the diameter of a beam is measured in a plane orthogonal to the direction of propagation of said beam. The diameter of the light beam FL is thus measured in a plane parallel to the plane Oxz. The optic SR is for example a self-reflecting mirror which, when it receives a light beam, reflects a part and transmits another part thereof.

The light beam FL is then separated by the optic SR into a first sub-beam F1 and a second sub-beam F2. The optic SR defines a first optical path C1 for the first sub-beam F1 and a second optical path C2 for the second sub-beam F2. The first and second sub-beams have substantially the same diameter as the initial light beam FL. The diameter of the first sub-beam is measured in a plane parallel to the plane Oxy, whereas the diameter of the second sub-beam is measured in a plane parallel to the plane Oxz. In the example of embodiment described here, the light beam FL arrives on the optic SR under an incidence a of the order of 45°. The light beam FL may also, in an equivalent manner, arrive on the optic SR under an incidence of the order of 135°. In the example of embodiment described here, the first sub-beam F1 is transmitted by the optic SR, whereas the second sub-beam F2 is reflected by the optic SR. According to a preferential alternative, the first sub-beam F1 is reflected by the optic SR, whereas the second sub-beam F2 is transmitted by the optic SR.

During the second step b), illustrated in FIG. 2b, the first sub-beam F1 propagates and reaches at least partially the first optic O1 arranged in the first optical path C1, whereas the second sub-beam F2 propagates and reaches at least partially the second optic O2 arranged in the second optical path C2. The positioning of the first optic O1 in the first optical path C1 and the second optic O2 in the second optical path C2 is chosen in such a way that the first sub-beam on leaving the first optic, referred to as "reference beam Fref", and the second sub-beam on leaving the second optic, referred to as "characterized beam Fcar", are separated by a time delay τ.

The first optic O1 is preferentially arranged so that the first sub-beam F1 reaches the first optic O1 under a normal incidence. The second optic O2 is preferentially arranged so that the second sub-beam F2 reaches the second optic O2 under a normal incidence. In other words, in the example considered, the first optic O1 is arranged parallel to the plane Oxy, whereas the second optic O2 is arranged parallel to the plane Oxz.

In the example of embodiment which is particularly illustrated in FIGS. 2a to 2c, the first sub-beam F1 and the second sub-beam F2 have flat or practically flat wave fronts. Downstream of the first optic O1, which is a divergent mirror, the reference beam Fref has spherical wave fronts. The wave fronts of the reference beam Fref are thus modified with respect to the wave fronts of the first sub-beam F1, on account of the first curvature of the first optic O1. Downstream of the second optic O2, which is a flat mirror, the characterized beam Fcar has flat or practically flat wave fronts, substantially identical to the wave fronts of the second sub-beam F2. According to an alternative, not illustrated, the first optic O1 may not modify the radius of curvature of the reference beam Fref with respect to the first sub-beam F1 and/or the second optic O2 may modify the radius of curvature of the characterized beam Fcar with respect to the second sub-beam F2, in so far as the radius of curvature of the first optic O1 is different to the radius of curvature of the second optic O2.

The second optic O2 preferentially has a diameter, here measured in a plane parallel to the plane Oxz, greater than or equal to the diameter of the light beam FL, so that the diameter of the characterized beam Fcar remains substantially the same downstream and upstream of the second optic O2. Generally speaking, the diameter dO2 of the second optic O2 is advantageously chosen such that:

$$dO2 > DFL * \sqrt{2}$$

with DFL the diameter of the light beam FL. In the example of embodiment described here, the diameter DFL of the light beam FL being of the order of 8 cm, the diameter dO2 is advantageously chosen such that: $DOp1 > 8*\sqrt{2}$. It is thus possible to choose a second optic O2 having a diameter dO2 of the order of 15 cm.

It is wished, in the method 10 for characterization according to the first embodiment of the invention, to control the time delay τ between the reference beam Fref and the characterized beam Fcar, in order that said time delay τ can scan a time interval T1 with a step P1. The choice of the time interval T1 and the step P1 is detailed later. The control means Pz is used in order to control the time delay τ between the reference beam Fref and the characterized beam Fcar. The control means Pz are typically a piezoelectric stage having a travel of 250 µm, making it possible to carry out movements with a precision of the order of several angstroms Å. The control means Pz preferentially make it possible to adjust the positioning along the z axis of the first optic O1. By translating said first optic O1 along the z axis, that is to say by varying the difference in optical path between the first and second optical paths C1 and C2, the time delay τ between the reference beam Fref and the characterized beam Fcar is controlled. According to an alternative, the control means Pz makes it possible to adjust the positioning along the y axis of the second optic O2. According to another alternative, the control means Pz makes it possible both to adjust the positioning along the z axis of the first optic O1 and to adjust the positioning along the y axis of the second optic O2. According to this latter alternative, the control means Pz then typically comprise a second piezoelectric stage. In the remainder of the present description, the terms "control means" and "piezoelectric stage" are employed indiscriminately.

The reference beam Fref and the characterized beam Fcar then propagate respectively along the first and second optical paths C1 and C2 to the optic SR, for the recombination of the reference beam Fref and the characterized beam Fcar. In the example of configuration considered here, the optic SR ensures firstly the function of separation of the light beam FL, and secondly the function of recombination of the reference beam Fref and the characterized beam Fcar. Nevertheless, instead of a single optic SR, a first optic ensuring the function of separation of the light beam FL and a second optic, separate from the first optic, ensuring the recombination function of the reference beam Fref and the characterized beam Fcar may alternatively be used. This alternative configuration is particularly illustrated in FIG. 3, described later.

During the third step c), illustrated in FIG. 2c, the reference beam Fref and the characterized beam Fcar are recombined by the optic SR. The reference beam Fref and the characterized beam Fcar then propagate to the measuring system SM1. The measuring system SM1 is arranged so that the characterized beam Fcar reaches the measuring system SM1 under a substantially normal incidence. Two planes parallel to the plane Oxy will be considered hereafter:
  a first plane z1, in which is carried out, for each time delay τ the measurement of the two-dimensional interference pattern M1, and
  a second plane z2, which is the plane of the first optic O1.

The first and second planes z1 and z2 are represented in FIGS. 2b and 2c.

The distancing of the measuring system SM1 with respect to the first optic O1, here measured along the z axis, is chosen such that, when the reference beam Fref and the characterized beam Fcar reach the first measuring plane z1, the diameter of the reference beam Fref is greater than or equal to, and preferentially greater than, the diameter of the characterized beam Fcar. Thus, this makes it possible that the reference beam Fref interferes spatially with the totality of the characterized beam Fcar. When the diameter of the reference beam Fref is equal to the diameter of the characterized beam Fcar, the totality of the reference beam Fref interferes with the totality of the characterized beam Fcar. In the preferential case where the diameter of the reference beam Fref is greater than the diameter of the characterized beam Fcar, only a part of the reference beam Fref interferes with the characterized beam Fcar. The further the measuring system SM1 is along the z axis from the optic SR, the greater the diameter of the reference beam Fref and the smaller the part of the reference beam Fref that interferes with the characterized beam Fcar. In this way, the smaller the part of the reference beam Fref that interferes with the characterized beam Fcar, the less said part of the reference beam Fref is likely to have defects, thus the better the quality of the results that can be obtained by the method 10 for characterization according to the first embodiment of the invention. The reference beam Fref also influences the contrast of the two-dimensional interference pattern M1, and thus the quality of the measurements. The contrast of the two-dimensional interference pattern M1 is in fact influenced by the ratio between the intensity of the characterized beam Fcar and that of the reference beam Fref, that is to say the ratio between the size of the characterized beam Fcar and that of the reference beam Fref in the first measuring plane z1. The contrast of the two-dimensional interference pattern M1 is optimum when the intensities of the characterized beam Fcar and the reference beam Fref are equal in the first measuring plane z1, which implies that the reference beam Fref is not too small. It thus involves finding a compromise for the size of the reference beam Fref.

Figure 4:
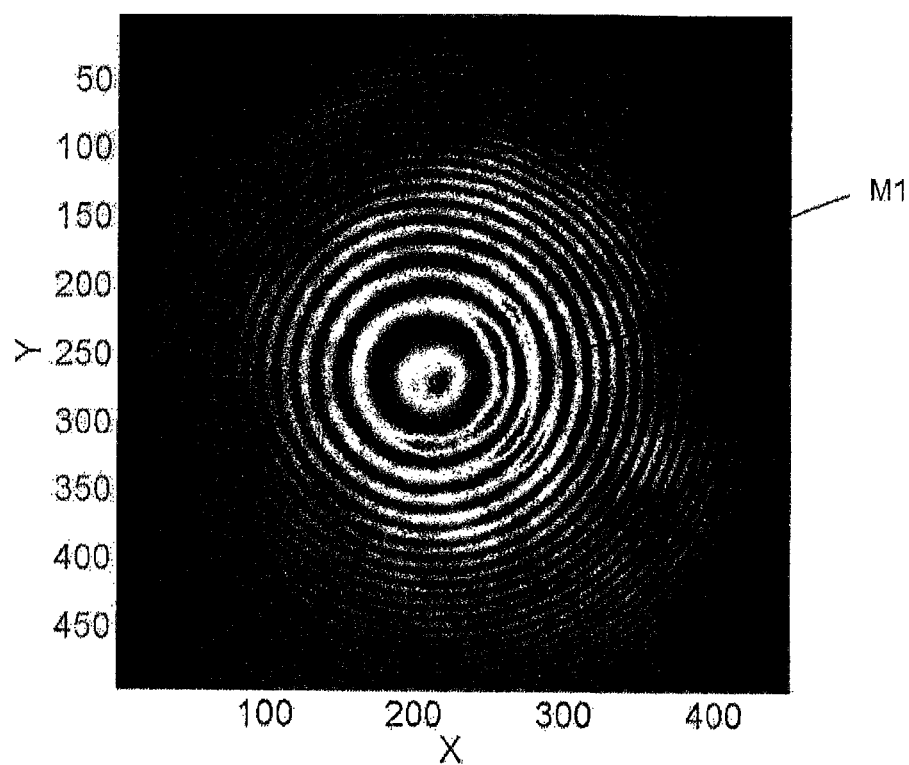
FIG. 4 illustrates an example of two-dimensional interference pattern for a given time delay measured experimentally during a step of the method for characterization of a light beam according to the first embodiment of the invention.

Following their recombination, the reference beam Fref and the characterized beam Fcar interfere spatially. When the reference beam Fref and the characterized beam Fcar, which are separated by a given time delay τ, reach the measuring system SM1, they form a two-dimensional interference pattern M1. The two-dimensional interference pattern M1 depends on the two transversal directions x and y and is measured for a given time delay τ. The two-dimensional interference pattern M1 may thus be noted: $M1_\tau(x,y)$. An example of two-dimensional interference pattern M1, measured experimentally for a given time delay τ, is represented in FIG. 4. The two-dimensional interference pattern M1 is typically a set of concentric rings, the thickness of the rings reduces as the rings move away from the centre of the pattern.

The two-dimensional interference pattern M1 is then measured by means of the measuring system SM1. At least two types of measuring system are proposed, as a function of the size, that is to say the diameter, of the characterized beam Fcar.
  A first type of measuring system, comprising only one sensor CCD (Charge-Coupled Device) of a camera, may be used in the case where the characterized beam Fcar is of diameter less than or equal to the diameter of said sensor CCD. In practice, this first type of measuring system could typically be used in the case of a characterized beam Fcar of diameter less than 1 cm.
  In the case where the characterized beam Fcar is of diameter greater than the diameter of said sensor CCD, a second type of measuring system could be used: this second type of measuring system comprises, apart from the sensor CCD, a diffusing screen E and an objective Obj. It is this second type of measuring system that is more particularly represented in FIGS. 2a to 2c. The diffusing screen E, for example arranged substantially parallel to the plane Oxy, diffuses a signal s1 of the two-dimensional interference pattern M1. The objective Obj captures the signal s1 and forms a reduced image of the two-dimensional interference pattern M1 on the sensor CCD.

With the first type as with the second type of measuring system SM1, the sensor CCD then records an image of the two-dimensional interference pattern M1. Said image may then be transmitted to the calculator K. The spatial resolution required for said image of the two-dimensional interference pattern M1 will be discussed later.

The three steps that have just been described, with reference to FIGS. 2a, 2b and 2c, are repeated for each time delay τ sweeping the time interval T1 with the step P1. The total number N of iterations of steps a), b) and c), corresponding to the number N of time delays τ for which it is wished to measure the two-dimensional interference pattern M1, equals: N=E(T1/P1)+1, where E designates the entire function part.

The choice of the time interval T1 and the step P1 for the sweeping, or scan, of the time delay τ will now be reconsidered. Two main conditions are met:

the first condition concerns the step P1. According to the Shannon criterion, the step P1 is sufficiently small to properly sample the optical period of the characterized beam Fcar, notably in order to avoid aliasing effects. The Shannon criterion thus indicates that two measuring points per optical period are carried out at the least. For a characterized beam Fcar of which the spectrum is centred at 800 nm, with an optical period of the order of 2.6 fs, the step P1 is thus less than around 1.3 fs, i.e. a movement of the first optic O1—or of the second optic O2—less than c×P1/2=200 nm, c designating the speed of light. It is thus wished to be able to control the movement of the first optic O1—or the second optic O2—with a sufficient precision, that is to say typically of the order of a nm. A piezoelectric stage Pz, as mentioned previously, is thus preferentially used to ensure the movement of the first optic O1 or the second optic O2. Such a piezoelectric stage Pz in fact ensures a precision less than one nm. In practice, the spectrum of the characterized beam Fcar has a certain width, and to avoid aliasing on the highest frequencies of said spectrum, a step P1 is preferentially chosen typically two times smaller than the minimum value derived from the Shannon criterion, i.e. in this particular example: P1≈0.7 fs.

The second condition concerns the time interval T1. It involves sweeping a sufficiently large time interval T1 to observe the interferences of the reference beam Fref with all points of the characterized beam Fcar. In fact, on account of the pulsed nature of the light beam FL, the interferences between the reference beam Fref and the characterized beam Fcar are only observed, for a given time delay τ, on a crown, which covers a part only of the characterized beam Fcar. To reconstruct the whole of the characterized beam Fcar, it is thus necessary to scan a sufficiently large time interval T1 so that this crown passes successively by all the points of the characterized beam Fcar. This notion is illustrated in FIGS. 5a to 5c and 6a to 6c.

Figure 5A:
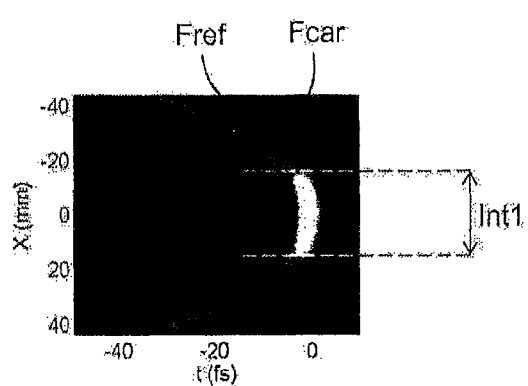
FIGS. 5a, 5b and 5c show respectively first, second and third simulations of space-time profiles of a characterized beam and of a reference beam, for first, second and third time delays between said reference beam and characterized beam.
Figure 6A:
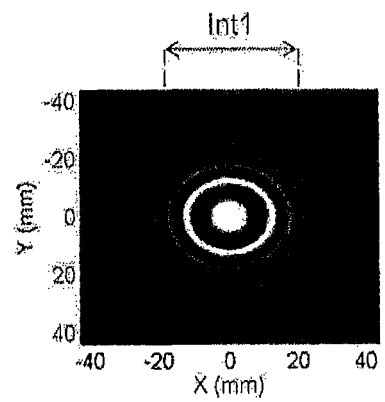
FIGS. 6a, 6b and 6c show respectively first, second and third two-dimensional interference patterns, corresponding respectively to the configurations of FIGS. 5a, 5b and 5c.

FIG. 5a shows a first simulation of the space-time profiles of the characterized beam Fcar and the reference beam Fref, for a zero time delay τ between said beams Fcar and Fref. In this first simulation, the reference beam Fref interferes with the characterized beam Fcar on a first zone Int1, situated at the centre of the characterized beam Fcar. On either side of this first zone Int1, side zones of the characterized beam Fcar do not interfere with the reference beam Fref. FIG. 6a shows a first two-dimensional interference pattern, corresponding to the configuration of FIG. 5a, that is to say with a zero time delay τ between the reference beam Fref and the characterized beam Fcar.

Figure 5B:
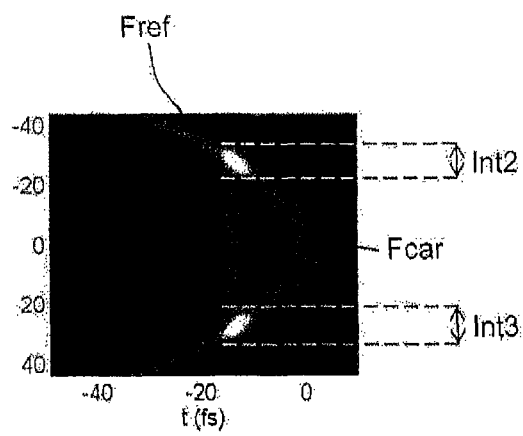
Figure 6B:
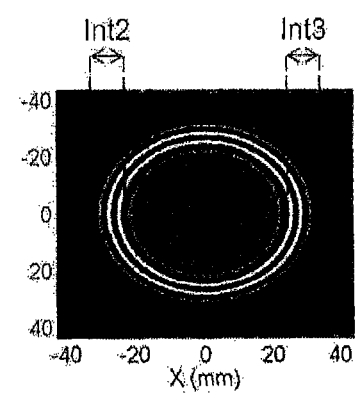

FIG. 5b shows a second simulation of the space-time profiles of the characterized beam Fcar and the reference beam Fref, for a time delay τ of 13 fs between said beams Fcar and Fref. In this second simulation, the reference beam Fref interferes with the characterized beam Fcar on the second and third zones Int2 and Int1. Between said second and third zones Int2 and Int3, a central zone of the characterized beam does not interfere with the reference beam Fref. FIG. 6b shows a second two-dimensional interference pattern, corresponding to the configuration of FIG. 5b, that is to say to a time delay τ of 13 fs between the reference beam Fref and the characterized beam Fcar.

Figure 5C:
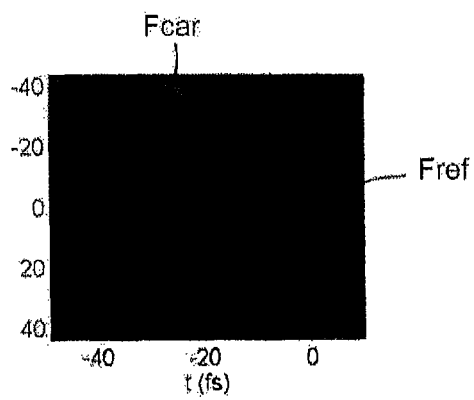
Figure 6C:
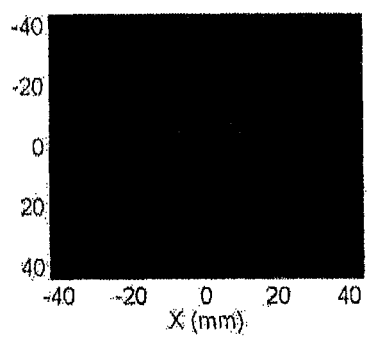

FIG. 5c shows a third simulation of space-time profiles of the characterized beam Fcar and the reference beam Fref, for a time delay τ of 27 fs separating said beams Fcar and Fref. In this third simulation, the reference beam Fref practically no longer interferes with the characterized beam Fcar. FIG. 6c shows a third two-dimensional interference pattern, corresponding to the configuration of FIG. 5c, that is to say to a time delay τ of 27 fs between the reference beam Fref and the characterized beam Fcar.

The time interval T1 to cover or, in an equivalent manner, the distance interval Δz to cover, may then be easily calculated, in a manner well known to those skilled in the art. The distance interval Δz may thus be expressed:

$$\Delta z = \frac{\Delta x^2}{2L}$$

with Δx=Δy the radius of the characterized beam Fcar and L the distance between the first optic O1 and the measuring plane. Knowing that the step in distance is, at the most, λ/2—with λ the wavelength of the characterized beam, the minimum total number N of steps to realise for a complete scan is:

$$N = \lambda x^2 / L \times \lambda$$

In the particular example described previously of the laser source SL, generating pulses of 25 fs and reaching a peak power of 100 TW, the characterized beam has a radius Δx=40 mm and a wavelength λ=800 nm.

In this particular case the result is thus: $N=2\cdot10^6/L$, the distance L between the first optic O1 and the measuring plane being expressed in mm. In order that the minimum number N of steps to carry out for a complete scan is not too important, advantageously large values will thus be used for the distance L between the first optic O1 and the measuring plane. For L=1000 mm for example, a minimum number N of steps to carry out which equals: $N=2\cdot10^3$. Knowing that the repetition rate of the laser source SL considered is 10 Hz, a complete scan then requires around 3 minutes, by only carrying out a single laser shot per measurement point.

It should be noted that in the hypothesis where the number of measuring points becomes critical, that is to say that it leads to a too long measuring time given the pace of the laser source SL, one possibility is to carry out several "fine" scans, that is to say with steps that respect the Shannon criterion as explained above, between which scans are carried out with much larger steps, which do not respect the Shannon criterion. A characterization is thus obtained of the characterized beam Fcar over a series of disjointed concentric rings, which may in many cases be sufficient to evaluate the space-time distortions present in the characterized beam.

The description of the steps of the method 10 for characterization of a light beam according to the first embodiment of the invention will now be continued. It may be recalled that the three steps described previously with reference to FIGS. 2a, 2b and 2c are repeated for each time delay τ sweeping the time interval T1 with the step P1. At the end of these N iterations, the sensor CCD has thus recorded, for each time delay τ sweeping the time interval T1 with the step P1, an image of the corresponding two-dimensional interference pattern M1, i.e. N images.

Figure 7A:
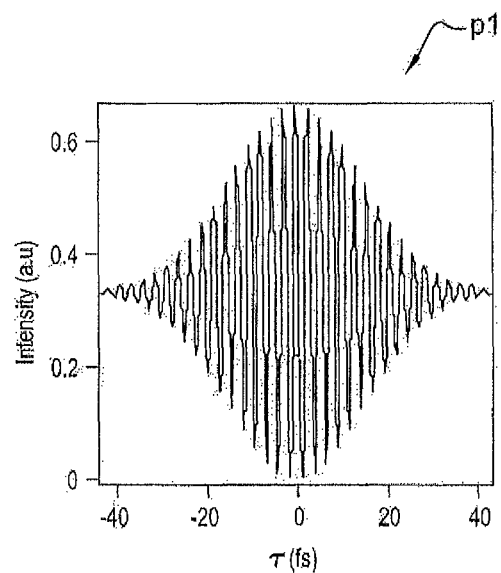
FIG. 7a shows the appearance of a partial temporal interferogram, measured at a given point (x,y).

During a fourth step d), the calculator K may then construct, from said N images of N two-dimensional interference patterns M1, a temporal interferogram S1. The temporal interferogram S1 depends on the two transversal directions x and y and the time delay τ, the time delay τ sweeping the time interval T1 with the step P1. The temporal interferogram S1 may thus be noted: $S1(x,y,\tau)$. FIG. 7a shows the typical appearance of a partial temporal interferogram p1, measured at a given point (x,y). The partial temporal interferogram p1 may thus be noted: $p1_{x,y}(\tau)$. The temporal interferogram S1 may be seen as the set, for all the points (x,y), of the partial temporal interferograms p1.

Figure 7B:
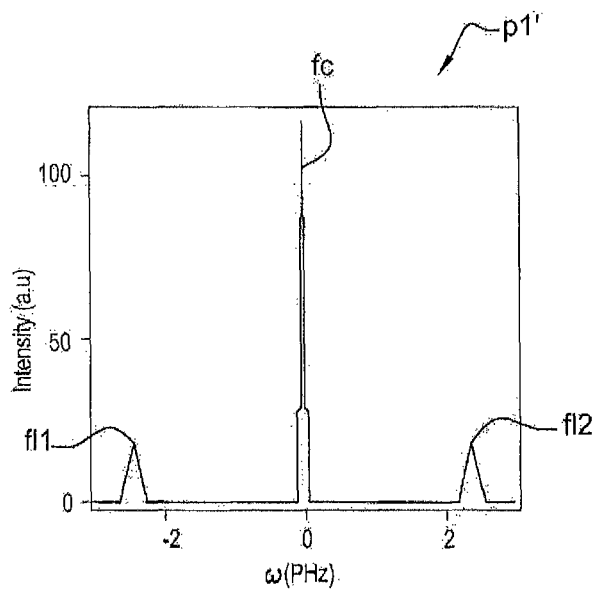

The calculator K then carries out the following fifth and sixth steps e) and f):

e) for each point (x,y), calculation of the Fourier transform S1' of the temporal interferogram S1 with respect to the variable τ, in order to pass into the space of frequencies ω. The Fourier transform S1' may thus be noted: $S1'(x,y,\omega)$. The Fourier transform S1' has a frequency central peak fc, a first frequency side peak fl1 and a second frequency side peak fl2. FIG. 7b shows the typical appearance of the partial Fourier transform p1' of the partial temporal interferogram p1 of FIG. 7a. The partial Fourier transform P1' may thus be noted: $p1'_{x,y}(\omega)$. The partial Fourier transform p1' thus represents partially, at a given point (x,y), the frequency central peak fc and the first and second frequency side peaks fl1 and fl2 of the Fourier transform S1'. The Fourier transform S1' may be seen as the set, for all the points (x,y), of the partial Fourier transforms p1'.

f) Selection of the first frequency side peak fl1 or the second frequency side peak fl2 of the Fourier transform S1' and calculation, for the frequency side peak selected, of its spectral amplitude $A_R(\omega)$, referred to as "relative spectral amplitude" and of its spatial-spectral phase $\varphi_R(x,y,\omega)$, referred to as "relative spatial-spectral phase". The choice of the frequency side peak selected determines the sign convention to apply to the results obtained thereafter.

The spatial-spectral phase $\varphi_R(x,y,\omega)$ of the frequency side peak selected is the difference in the spatial-spectral phase of the characterized beam Fcar and the spatial-spectral phase of the reference beam Fref. The spectral amplitude $A_R(\omega)$ of the frequency side peak selected is the product of the spectral amplitude of the characterized beam Fcar and the spectral amplitude of the reference beam Fref. The steps that have been described thus make it possible to obtain:

the spatial-spectral phase of the characterized beam Fcar relatively to the spatial-spectral phase of the reference beam, hence the designation "relative spatial-spectral phase";

the spectral amplitude of the characterized beam Fcar relative to the spectral amplitude of the reference beam, hence the designation "relative spectral amplitude".

All the points (x,y) of the characterized beam Fcar may thus be compared with a same reference, which may potentially remain undetermined. this type of characterization of a beam relative to a reference typically makes it possible to access variations in shape of an electromagnetic field E(x,y,t) as a function of the transverse directions x and y and time t.

A return will now be made to the spatial resolution required during the acquisition, for each time delay τ, of an image of the two-dimensional interference pattern M1 by the sensor CCD of the measuring system SM1. As FIG. 4 shows for example, the method 10 for characterization of a light beam according to the first embodiment of the invention implies measuring very tightly packed interference fringes. This stems from the fact that a practically flat wave front, that of the characterized beam Fcar, is made to interfere with a spherical wave front, that of the reference beam Fref. On moving away from the centre of the recombined beam, the angle between these two fronts thus becomes greater and greater, as illustrated for example in FIGS. 5a to 5c, so that the interference fringes become more and more tightly packed. In the case of a light source SL of large diameter—like for example, the particular case of light source SL described above, which emits a light beam FL of 80 mm diameter, this implies having available good spatial resolution for the measurement of the two-dimensional interference patterns M1, and thus temporal interferograms S1. In practice, this imposes using a camera of which the number of pixels is sufficient to make it possible to resolve the interference fringes. In the example of configuration described herein, a 29 Mpx camera is thus used. It is on the other hand not necessary to seek to reconstruct the electromagnetic field of the characterized beam on the set of these pixels, because it is very improbable that the structure of said electromagnetic field varies spatially with such high frequencies, for the large majority of existing light sources. A 100×100 meshing along the x and y axes is in practice entirely sufficient to reconstruct the laser beam to characterize Fcar. To limit the volume of data to process and the processing time, it is thus advantageously possible to sub-sample the images of the two-dimensional interference patterns once they have been acquired, and to only keep data on a sub-meshing of the initial images.

Complementarily to the description that has been given of the first embodiment of the invention, a mathematical analysis of said method 10 is presented below. Let Ecar(x,y,z,t) be the electromagnetic field of the characterized beam Fcar. Let Eref(x,y,z,t) be the electromagnetic field of the reference beam Fref, of which the exact expression may potentially remain undetermined, or instead be precisely determined, according to a variant described later. As described previously, the electromagnetic field Eref(x,y,z,t) of the reference beam Fref may be shifted by a time delay τ, or retardation, variable with respect to the electromagnetic field Ecar(x,y,z,t) of the characterized beam Fcar.

The electromagnetic fields Ecar(x,y,z,t) and Eref(x,y,z,t) of the characterized beam Fcar and the reference beam Fref may be defined in a complex manner, that is to say in the general form: $E(t)=\hat{E}\exp(i\omega_L t)$, with $\hat{E}$ the complex envelope and $\omega_L$ the carrier frequency.

At one point (x,y,z1) of the first plane z1, the total field Etot(x,y,z1,t), resulting from the superposition of the field Ecar(x,y,z,t) of the characterized beam Fcar and the field Eref(x,y,z,t) of the reference beam Fref, is equal to:

$$Etot(x,y,z1,t)=Ecar(x,y,z1,t)+Eref(x,y,z1,t-\tau)$$

The temporal interferogram S1 is measured, that is to say the quantity of incident light at each point of the first plane z1, time integrated, which is thus proportional to:

$$S1(x,y,\tau) = \int |Ecar(x,y,z1,t) + Eref(x,y,z1,t-\tau)|^2 dt$$

This therefore results in:

$$S1(x, y, \tau) = \varepsilon 1 + \varepsilon 2 + \int Ecar(x, y, z1, t) \times Eref^*(x, y, z1, t - \tau) dt + \int Ecar^*(x, y, z1, t) \times Eref(x, y, z1, t - \tau) dt$$

where ε1 and ε2 are the signals respectively obtained with the characterized beam Fcar only and with the reference beam Fref only at the point (x,y) of the measuring plane z1.

When the temporal interferogram $S1(x,y,\tau)$ is measured as a function of τ, three terms are thus obtained.

The first term, ε1+ε2, independent of τ, is the incoherent sum of the characterized beam Fcar and the reference beam Fref.

The second term, noted $J(x,y,\tau)=\int Ecar(x,y,z1,t)\times Eref^*(x,y,z1,t-\tau)dt$, is the cross-correlation function between the electromagnetic field Ecar(x,y,z1,t) of the characterized beam and the electromagnetic field Eref(x,y,z1,t) of the reference beam.

The third term, noted $J^*(x,y,\tau)=\int Ecar^*(x,y,z1,t)Eref(x,y,z1,t-\tau)dt$, is the conjugate of the second term, that is to say the cross-correlation function between the electromagnetic field Eref(x,y,z1,t) of the reference beam and the electromagnetic field Ecar(x,y,z1,t) of the characterized beam.

By using the breakdown into complex and carrier envelope, the result for the second term J(x,y,τ) is:

$$J(x,y,\tau)=e^{i\omega_L\tau}\int \hat{E}car(x,y,z1,t)\times \hat{E}ref^*(x,y,z1,t-\tau)dt$$

The function J(x,y,τ) thus oscillates at the frequency $\omega_L$ as a function of τ, whereas its conjugate oscillates at the frequency $-\omega_L$ as a function of τ. By carrying out the Fourier transform of $S1(x,y,\tau)$ with respect to τ, three peaks are thus obtained, corresponding to the three terms of the above sum, centred respectively at the frequencies of 0, $\omega_L$, and $-\omega_L$. This point is illustrated in particular in FIG. 7b, described previously.

It is then possible to select the peak corresponding to the Fourier transform of J(x,y,τ).

According to the preceding equation for J(x,y,τ) and the cross-correlation theorem, the Fourier transform J'(x,y,ω) with respect to the variable τ of the function J(x,y,τ) is given by the relation:

$$J'(x,y,\omega)=\hat{E}car'(x,y,z1,\omega)\times \hat{E}ref'^*(x,y,z1,\omega) \otimes \delta(\omega-\omega_L)$$

where the functions noted «'» correspond to the Fourier transforms with respect to τ. In other words, by carrying out the Fourier transform of $S1(x,y,\tau)$ with respect to τ, and by selecting the frequency side peak centred on $\omega_L$ of this Fourier transform, the product of the spectrum of the electromagnetic field of the characterized beam is obtained, $\hat{E}car'(x,y,z1,\omega)$, and the conjugated spectrum of the electromagnetic field of the reference beam, $\hat{E}ref'^*(x,y,z1,\omega)$. It may be observed that the frequency side peak centred at $-\omega_L$ may also be chosen. The product of the conjugated spectrum of the electromagnetic field of the characterized beam, and the spectrum of the electromagnetic field of the reference beam is thus obtained. The choice of the frequency side peak selected determines simply the sign convention to apply to the results obtained thereafter.

Thus, as described above, this measurement thus gives access, using the definitions of the spectral amplitude and the spatial-spectral phase:
  to the product of the spectral amplitudes of the electromagnetic field of the characterized beam and of the electromagnetic field of the reference beam,
  and to the difference in the spatial-spectral phases of the electromagnetic field of the characterized beam and of the electromagnetic field of the reference beam.

A first variant of the first embodiment of the invention will now be described. Said first variant advantageously makes it possible to take into account potential fluctuations of properties, such as the intensity and/or the spatial distribution of the intensity, of the light source SL over time, that is to say typically from one pulse to the next in the case of a pulsed light source SL. Potential fluctuations of the intensity and/or the spatial distribution of the intensity of the light source SL during the sweeping time interval T1 are in fact capable of degrading the two-dimensional interference patterns M1 measured, and thus the complex spectra that are deduced therefrom.

Figure 8:
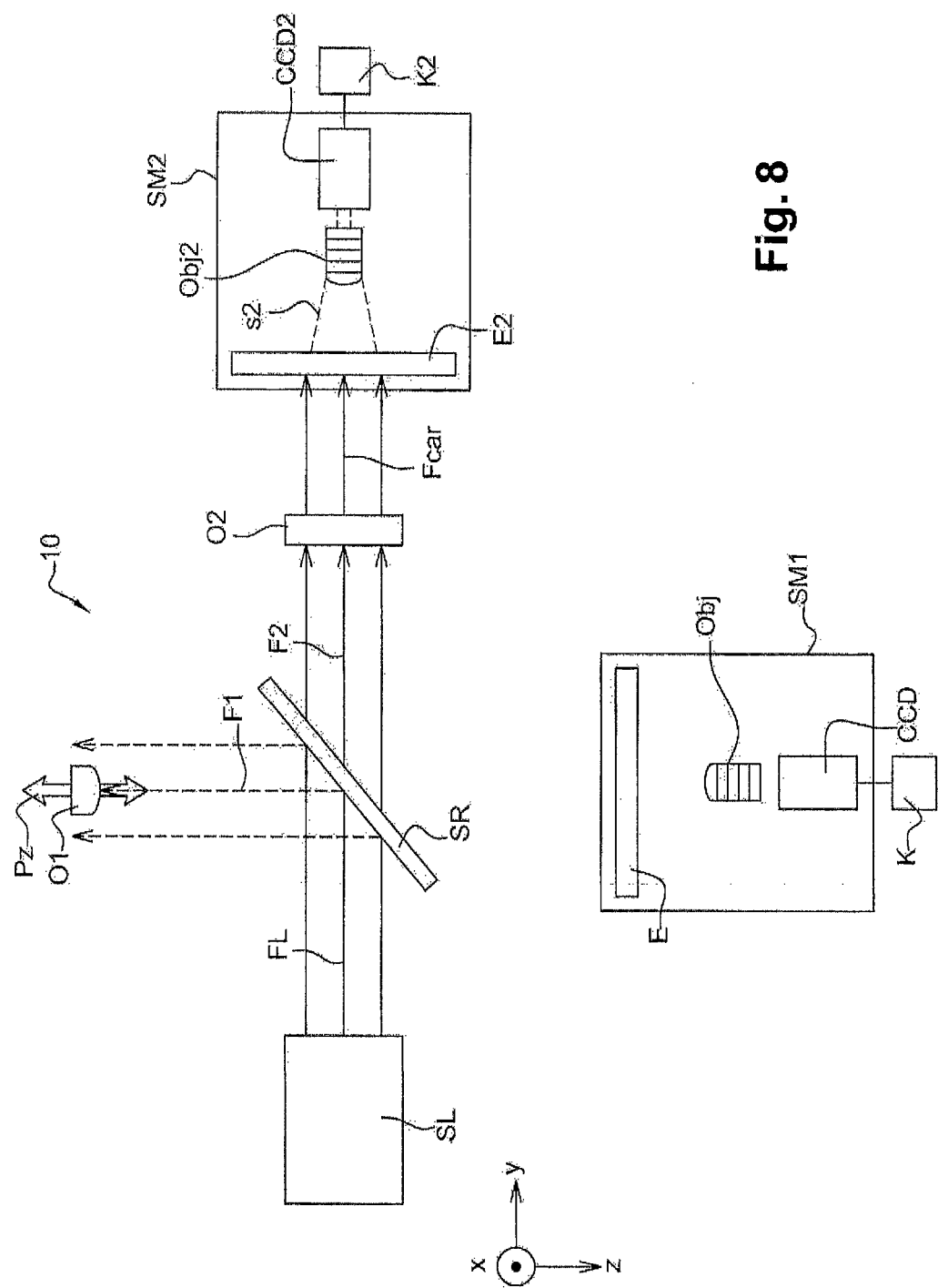
FIG. 8 illustrates a first variant of the method for characterization of a light beam according to an embodiment of the invention.

In this first variant, the method 10 for characterization of a light beam according to the first embodiment of the invention comprises a step g), illustrated in FIG. 8, of calculation of at least one property, such as the intensity and/or the spatial distribution of the intensity, of the light source SL over time. In the case of a calculation of the spatial distribution of the intensity, said calculation may then be used to correct, at least partially, the effect of a potential fluctuation of the spatial distribution of the intensity of the light source SL on the interferometric measurement carried out. To calculate at least one property of the light source SL, it is possible to carry out a simple sample-taking on the light beam FL and to image said sample-taking. This may for example be carried out by placing a separator optic in the path of the light beam FL, upstream of the optic SR. This solution is not however ideal, because for an ultrashort beam of large diameter, said separator optic is capable of significantly affecting the space-time properties of the light beam FL. A preferential solution consists in using a second optic O2 that is only partially reflecting, that is to say for example a bare glass slide. It is then possible to measure the spatial intensity profile of the characterized beam Fcar on the part transmitted through the second optic O2, said transmitted part not being used thereafter for interference purposes. The use of a partially reflecting optic moreover makes it possible to contribute to better balancing of the energies of the characterized beam Fcar and the reference beam Fref, and thus to obtain a better contrast for the two-dimensional interference patterns M1.

In the particular example represented in FIG. 8, step g) is carried out after the first step a) of separation of the light beam FL, and before the third step c) of recombination of the reference beam Fref and the characterized beam Fcar. The optical mounting of FIG. 8 comprises, compared to the optical mounting described previously in relation with FIGS. 2a to 2c:
  a second optic O2 also making it possible to transmit a part of the characterized beam Fcar, for example a bare glass slide;
  a second measuring system SM2 and, optionally, a second calculator K2.

According to the first variant, at the end of said first step a), the second sub-beam F2 propagates to the second optic O2. The second optic O2 reflects a first part of the second sub-beam F2, and transmits a second part of the second sub-beam F2. The first part of the second sub-beam F2 that is reflected is a first part of the characterized beam Fcar and propagates to the optic SR in order to be recombined with the reference beam Fref, as described previously. The second part of the characterized beam Fcar that is transmitted is a second part of the characterized beam Fcar and propagates to the second measuring system SM2.

The second measuring system SM2 is arranged such that the second part of the characterized beam Fcar reaches said second measuring system SM2 under a substantially normal incidence. The second measuring system SM2 is furthermore analogous to the first measuring system SM1 described previously in relation with FIGS. 2a to 2c. The second measuring system thus comprises, as a function of the size of the second part of the characterized beam Fcar:

uniquely one second sensor CCD, referenced "CCD2";
or, in addition to the second sensor CCD2, a second diffusing screen E2 and a second objective Obj2. This is the case that is more particularly represented in FIG. 8.

The second diffusing screen E2, here arranged parallel to the plane Oxz, diffuses a signal s2 of the second part of the characterized beam Fcar. The second objective Obj2 captures said signal s2 and forms a reduced image of the second part of the characterized beam Fcar on the second sensor CCD2. The second sensor CCD2 then records an image of the second part of the characterized beam Fcar. Said image may then be transmitted to the calculator K described previously, or alternatively to a second calculator K2, for the analysis of the properties of the second part of the characterized beam Fcar. The properties of said second part of the characterized beam Fcar are characteristics of the properties of the light flux FL.

Step g), which has just been described, may be carried out at least one once for each time delay $\tau$ sweeping the time interval T1 with the step P1, that is to say at least N times. In particular, in the case of a pulsed light source SL, step g) that has been described may be carried out for each pulse. In order to minimize the sweeping duration, preferentially a single pulse per time delay $\tau$ is used. Nevertheless, for a given time delay $\tau$ of the time interval T1, several pulses may alternatively be used.

A second variant of the first embodiment of the invention will now be described, in relation with FIG. 9. Said second variant advantageously makes it possible to obtain an absolute characterization of the characterized beam Fcar, independently of the reference beam Fref. It should be noted that the first and second variants may be combined or used independently of each other.

This involves, in order to achieve an absolute characterization of the characterized beam Fcar, measuring:

the spatial-spectral phase $\varphi_{ref}(x,y,\omega)$ of the reference beam Fref, and the spectral amplitude $A_{ref}(\omega)$ of the reference beam Fref.

Knowing said spatial-spectral phase $\varphi_{ref}(x,y,\omega)$ and spectral amplitude $A_{ref}(\omega)$ of the reference beam Fref, it is possible in fact to determine the absolute spatial-spectral phase and the absolute spectral amplitude of the characterized beam Fref, and to do so at any point (x,y) where the measurement of the temporal interferogram S1 has been carried out.

Figure 9:
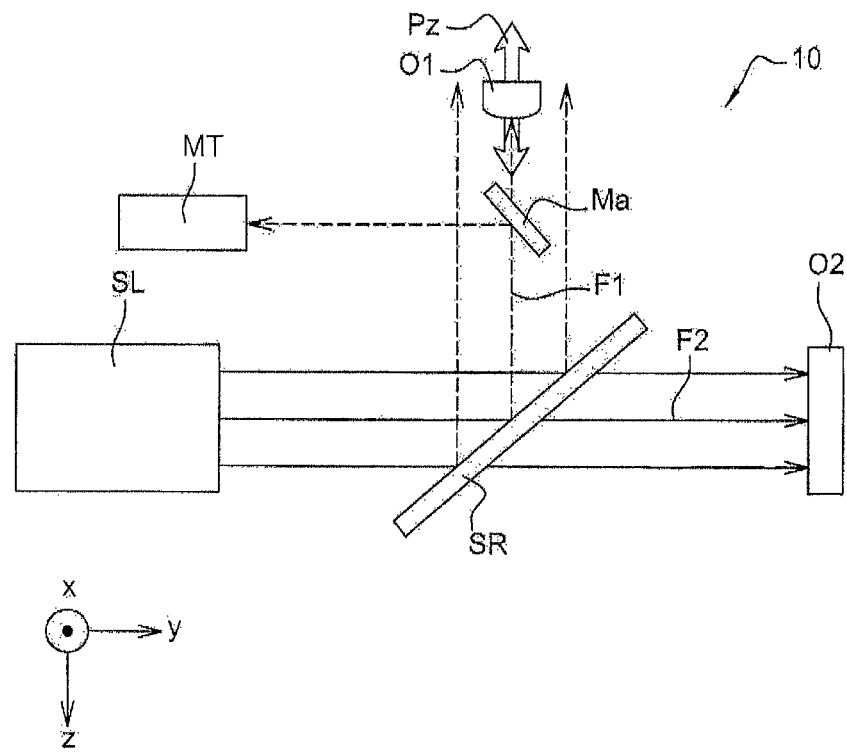
FIG. 9 illustrates a second variant of the method for characterization of a light beam according to an embodiment of the invention.
Figure 9:
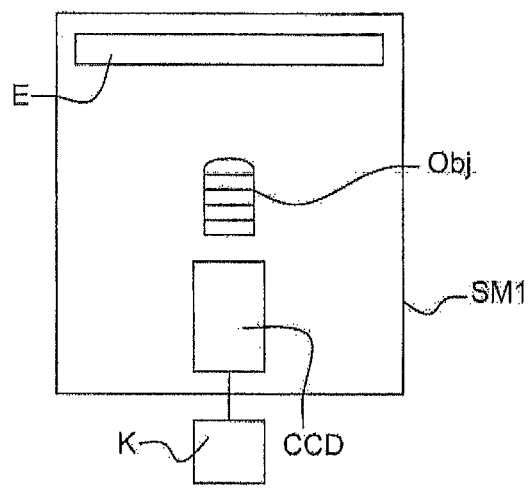

In this second variant, the method 10 for characterization of a light beam according to the first embodiment of the invention thus comprises:

a step i), illustrated in FIG. 9, of measuring the spatial-spectral phase $\varphi_{ref}(x,y,\omega)$ of the first sub-beam F1, and a step of measuring the spectral amplitude $A_{ref}(x,y,\omega)$ of the first sub-beam F1.

The two steps that have just been described may typically be carried out in a simultaneous manner by a same device.

In the particular example represented in FIG. 9, step i) is carried out after the first step a), during which the light beam FL is separated into the first sub-beam F1 and the second sub-beam F2, and before the second step b), during which the first sub-beam F1 is reflected by the first optic O1. The optical mounting of FIG. 9 comprises, compared to the optical mounting described previously in relation with FIGS. 2a to 2c:

a time measuring system MT;
a removable mirror Ma, making it possible when it is in place to direct at least one part of the reference beam to the time measuring system MT.

According to the second variant, the removable mirror Ma is arranged in the first optical path C1 of the first sub-beam F1 such that, at the end of the first step a), at least one part of said first sub-beam F1 propagates to the temporal measuring system MT. Alternatively to the removable mirror Ma, the use of a non-removable semi-reflecting optic, making it possible to transmit a first part of the first sub-beam F1 and to reflect a second part of the first sub-beam F1, may be envisaged. Nevertheless, since any transmission of a beam through an optic generally has an impact on the properties of said beam, it is preferred to use the removable mirror Ma. The temporal measuring system MT may for example use:

a FROG (Frequency-Resolved Optical Gating) device,
a SPIDER (Spectral Phase Interferometry for Direct Electric field Reconstruction) device, or
a SRSI (Self-Referenced Spectral Interferometry) device.

This thus results, at the end of step i) that has just been described, in a measurement of the spatial-spectral phase $\varphi_{ref}(x,y,\omega)$ of the first sub-beam F1. It is then possible, by subtracting said spatial-spectral phase $\varphi_{ref}(x,y,\omega)$ from the relative spatial-spectral phase $\varphi_R(x,y,\omega)$, for example by means of the calculator K, to access the spatial-spectral phase of the characterized beam Fcar, referred to as "absolute spatial-spectral phase".

The spectral amplitude $A_{ref}(\omega)$ may typically be measured thanks to the time measuring system MT used to measure the spatial-spectral phase $\varphi_{ref}(x,y,\omega)$, or alternatively be measured using a spectrometer.

A measurement of the spectral amplitude $A_{ref}(\omega)$ of the reference beam Fref is thus obtained. It is then possible, by dividing the relative spectral amplitude $A_R(\omega)$ by the spectral amplitude $A_{ref}(\omega)$ of the reference beam Fref, to access the spectral amplitude of the characterized beam Fcar, referred to as "absolute spectral amplitude".

In addition to the description that has been made of the first variant of the first embodiment of the invention, a mathematical analysis of said first variant is presented below. The method 10 for characterization of a light beam according to the first embodiment of the invention in fact makes it possible to obtain an electromagnetic field of the reference beam having a simple expression, and which can thus be determined experimentally according to said second variant.

Let (x0,y0) be the coordinates of the reference point in the second plane z2 of the first optic O1, that is to say the point generating the reference beam Fref that effectively interferes with the characterized beam Fcar in the first measuring plane z1 of the two-dimensional interference pattern M1 for each time delay $\tau$. It is in fact possible to consider that said reference point (x0,y0) is a point source, the electromagnetic field of which is homogeneous, in so far as the reference beam Fref interfering with the characterized beam Fcar in the first plane z1 is derived from a part of said reference beam Fref in the second plane z2 which is small compared to the characterized beam Fcar in the first plane z1. In practice, the surface area of said part of the reference beam Fref in the second plane z2 is typically of the order of 10% of the surface area of the characterized beam Fcar in the first plane z1. The surface area of said small part of the reference beam Fref in the second plane z2 is not necessarily equal to the surface of the first optic O1. The reference point field, in the second plane z2, is noted in the following manner:

$$Pref(t)=Pref(x0,y0,z2,t)$$

The electromagnetic field of the reference beam Fref in the first measuring plane z1 may then be approximated by:

$$Eref(x,y,z1,t)=Pref(t-r/c)$$

where r is the distance between the reference point, of coordinates (x0,y0,z2), and each point (x,y) of the first measuring plane z1, of coordinates (x,y,z1). The distance r(x,y) may thus be calculated geometrically, and is given by the relation:

$$r(x,y)=\sqrt{(D+f)^2+x^2+y^2}$$

where D=z1−z2 is the distance between the first optic O1 and the first plane z1, and f is the focal length of the first optic O1. In practice, typically: D≫f. In the particular example of embodiment described here, D=3 m, and f=250 mm. The spectrum of the electromagnetic field of the reference beam in the first plane z1 is thus given by the relation:

$$\hat{E}ref'(x, y, z1, \omega) = \hat{P}ref'(\omega) \times \exp\left[i \times \frac{\omega}{c} \times r(x, y)\right]$$

The characterization of $\hat{E}car'(x,y,z1,\omega)$ in amplitude and in phase requires knowing $\hat{E}ref'(x,y,z1,\omega)$, which thus passes by the measurement of $\hat{P}ref'(\omega)$, once again in amplitude and phase. This measurement of the complex electromagnetic field at one point may be entirely carried out using existing technology, currently implemented in commercially available devices, using the FROG, SPIDER or SRSI methods, mentioned previously.

A third variant of the first embodiment of the invention will now be described. Said third variant advantageously makes it possible to take into account the curvature of the wave front of the reference beam Fref that is potentially introduced by the first optic O1 and/or the curvature of the wave front of the characterized beam Fcar that is potentially introduced by the second optic O2. In the example of embodiment that has been described up to now, the first sub-beam F1 on entering the first optic O1 is a plane, and the reference beam Fref on leaving the first optic O1 is a spherical wave. Thus, the case is more particularly described where the third variant takes into account the curvature of the wave front of the reference beam Fref that is introduced by the first optic O1. It should be noted that said third variant may be combined with the first variant and/or with the second variant, described previously, or implemented independently of said first and second variants.

According to said third variant, after the reflection of the first sub-beam F1 on the first optic O1 and before the recombination of the reference beam Fref with the characterized beam Fcar, a measurement is carried out of the spatial phase at a given frequency $\omega_0$ of the reference beam $\varphi_{ref}(x,y,\omega_0)$. A Shack-Hartmann device may typically be used to carry out the measurement of the spatial phase of the reference beam. Said spatial phase $\varphi_{ref}(x,y,\omega_0)$ is characteristic of the curvature of the wave front of the reference beam Fref introduced by the first optic O1.

It is thus possible to subtract, for example by means of the calculator K, the spatial-spectral phase $$\frac{\omega}{\omega_0} \varphi_{ref}(x, y, \omega_0)$$

from the relative spatial-spectral phase or from the absolute spatial-spectral phase of the characterized beam Fcar, obtained previously, to obtain respectively a corrected relative spatial-spectral phase or a corrected absolute spatial-spectral phase of the characterized beam Fcar.

Figure 3:
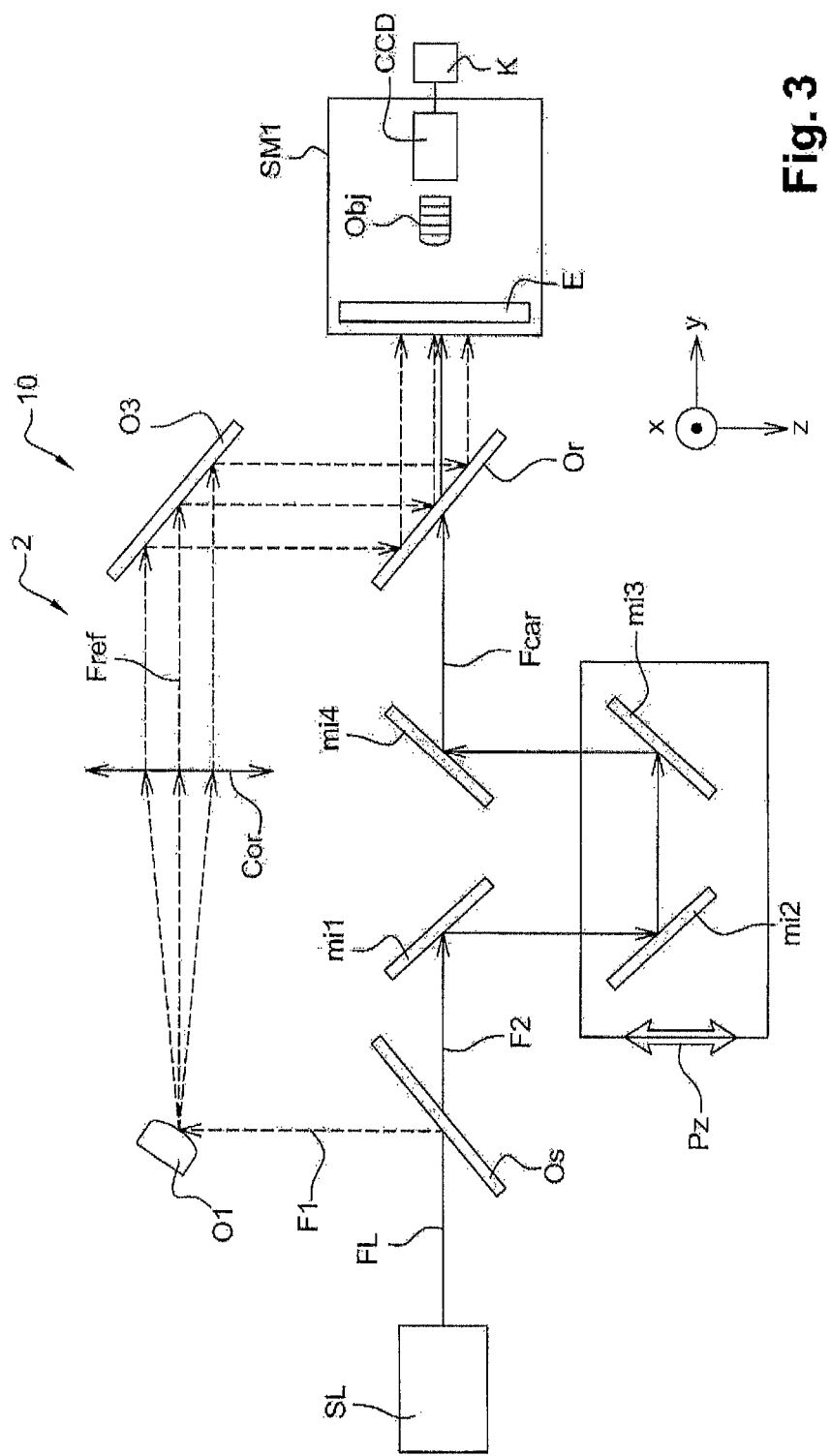
FIG. 3 illustrates an alternative configuration of the method for characterization of a light beam according to the first embodiment of the invention, using a second device for characterization of a light beam.

An alternative to this third variant may be envisaged, which will now be described, in relation with FIG. 3. FIG. 3 shows a second device 2 for characterization of a light beam, which may alternatively be implemented in the method 10 according to the first embodiment of the invention. The device 2 comprises:
 a separator optic Os for the separation of the light beam FL into the first sub-beam F1 and the second sub-beam F2;
 the first optic O1;
 a wave front corrector optic Cor and a third optic O3;
 the second optic O2, which comprises advantageously first, second, third and fourth mirrors mi1, mi2, mi3 and mi4;
 the means of controlling Pz a time delay τ;
 a recombiner optic Or for the recombination of the reference beam Fref and the characterized beam Fcar;
 the measuring system SM1;
 and the calculator K.

The first optic O1 is arranged in the optical path of the first sub-beam F1, downstream of the separator optic Os. The wave front corrector optic is arranged in the optical path of the reference beam Fref, downstream of the first optic O1. The third optic O3, which is typically a flat mirror, is arranged in the optical path of the reference beam Fref, downstream of the wave front corrector optic and upstream of the recombiner optic Or.

The first, second, third and fourth mirrors mi1 to mi4 that form the second optic O2 are arranged in the optical path of the second sub-beam F2, downstream of the separator optic Os. The recombiner optic Or is arranged both in the optical path of the reference beam Fref, downstream of the third optic O3, and in the optical path of the characterized beam Fcar, downstream of the fourth mirror mi4 of the second optic O2.

The wave front corrector optic Cor advantageously makes it possible to correct the curvature of the wave front of the reference beam Fref, which is due to the reflection of said reference beam Fref on the first optic O1, and to obtain a flat wave front for said reference beam Fref. This thus advantageously contributes to obtaining less closely packed interference fringes for the two-dimensional interference pattern M1 between the reference beam Fref and the characterized beam Fcar. Increasing the spacing between said interference fringes makes it possible to reduce the spatial resolution constraint for the measuring system SM1. In fact, the more closely packed the interference fringes, the higher the spatial resolution of the measuring system SM1 has to be. Increasing the spacing between said interference fringes also makes it possible to reduce the time interval to scan.

This involves introducing the wave front corrector optic Cor in the optical path of the reference beam Fref, downstream of the first optic O1 and upstream of the recombiner optic Or. Thanks to the alternative configuration illustrated in FIG. 3, the introduction of such a corrector optic in the optical mounting has no influence on the characterized beam Fcar. The wave front corrector optic Cor may typically be:
- a convergent lens arranged in such a way that the first optic O1 is located at the main object focus of the convergent lens, or
- a telescope comprising a divergent mirror and a convergent mirror, making it possible to spread out the reference beam Fref while conserving a flat wave front for the reference beam Fref.

The reference beam Fref leaving the corrector optic Cor is then parallel and has substantially flat wave fronts.

The device 2 advantageously comprises the first, second, third and fourth mirrors mi1, mi1, mi3 and mi4, forming the second optic O2. The first mirror mi1 is arranged downstream of the separator optic Os in the optical path of the second sub-beam F2. The first mirror mi1 makes it possible to direct the second sub-beam F2 to the control means Pz. In the particular configuration described here, the control means Pz make it possible to adjust simultaneously the positioning of the second and third mirrors mi2 and mi3 along the z axis. The control means Pz advantageously comprise a single piezoelectric stage for the precise, simultaneous and identical movement of the second and third mirrors mi2 and mi3. Alternatively, the control means Pz may comprise a piezoelectric stage for each of the second and third mirrors mi2 and mi3. On leaving the third mirror mi3, the second sub-beam F2 is directed to the fourth mirror mi4. The fourth mirror mi4 makes it possible to direct the second sub-beam F2 to the recombiner optic Or. Thanks to the assembly that has been described of the first, second, third and fourth mirrors mi1 to mi4 and the control means Pz, the time delay τ between the reference beam Fref and the characterized beam Fcar may advantageously be controlled precisely while conserving the alignment of the optical mounting. In fact, the translation along the z axis of the second and third mirrors mi2 and mi3, controlled by the control means Pz, does not require any realignment of the first and fourth mirrors mi1 and mi4 nor any other optic element.

A fourth variant of the first embodiment of the invention will now be described. Said fourth variant advantageously makes it possible to identify potential points (x,y) of the characterized beam Fcar in the first measuring plane z1 for which the spectra of the characterized beam Fcar and the reference beam Fref do not overlap, or overlap only partially. In fact, for such points (x,y), no interference occurs between the characterized beam Fcar and the reference beam Fref, and the method 10 for characterization of a light beam according to the first embodiment of the invention encounters a limit. These cases, rare, may nevertheless occur for certain types of space-time couplings, for example if the characterized beam Fcar has spatial "chirp", or spatial frequency drift, in the first measuring plane z1, that is to say if the spectral amplitude of the characterized beam Fcar varies spatially. It should be noted that said fourth variant may be combined with the first variant and/or with the second variant and/or with the third variant described previously, or implemented independently of said first, second and third variants Thus, in the fourth variant of the first embodiment of the invention, it is proposed using a first flat optic O1 and a second flat optic O2. The reference beam Fref is then identical to the characterized beam Fcar, thus the optical mounting obtained makes it possible to make each point of the characterized beam interfere with itself. It is then possible to carry out a spatially resolved Fourier spectroscopy. The Fourier transform of the temporal interferogram measured at each point of the characterized beam Fcar makes it possible to access the spectral intensity of the characterized beam at each of its points. Potential problems of spatial chirp at certain points of the beam may then be detected, thus making it possible to identify potential limitations of the reconstruction of the characterized beam Fcar, carried out by the method 10 according to the first embodiment of the invention.

A fifth variant of the first embodiment of the invention will now be described, which advantageously makes it possible to eliminate, at least partially, the potential points (x,y) of the characterized beam Fcar in the first measuring plane z1 for which the spectra of the characterized beam Fcar and the reference beam Fref do not overlap, or overlap only partially. It should be noted that said fifth variant may be combined with one or more of the first, second, third and fourth variants described previously, or implemented independently of said first, second, third and fourth variants.

Figure 10:
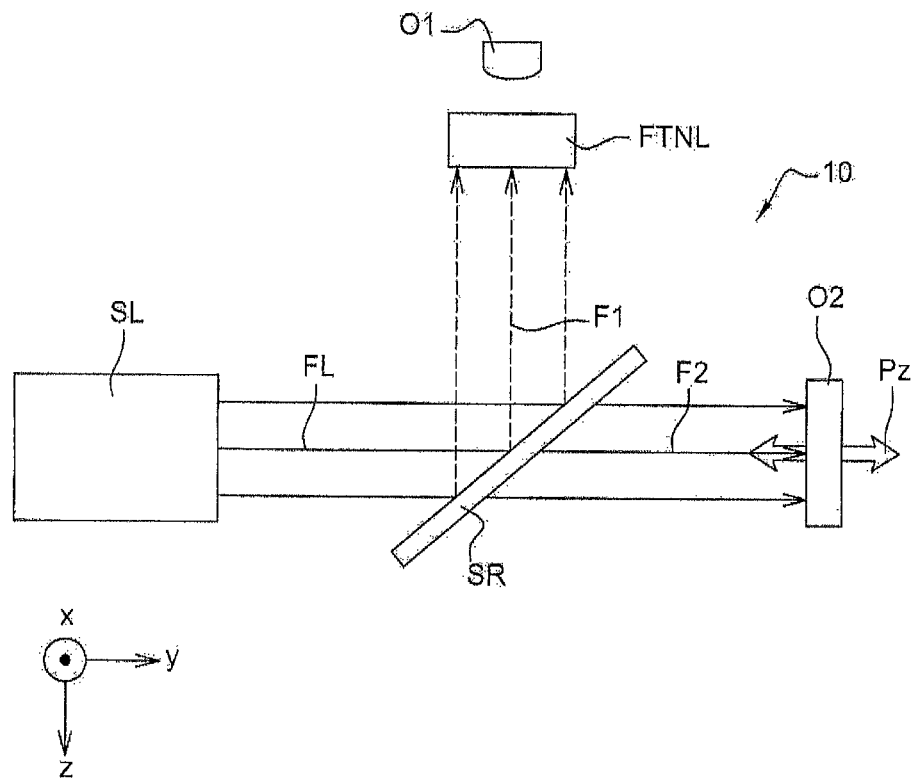
FIG. 10 illustrates a fifth variant of the method for characterization of a light beam according to an embodiment of the invention.
Figure 10:
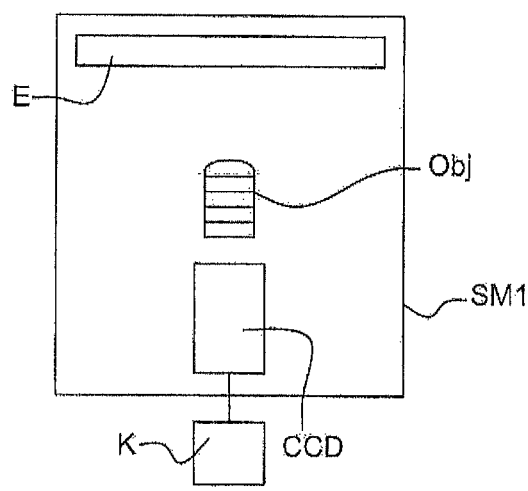

Thus, in the fifth variant of the first embodiment of the invention, it is proposed to add a step of filtering of the first sub-beam F1, in order to increase the quality of said first sub-beam F1 Said filtering step may typically consist in the introduction of a non-linear optic element in the optical path of the first sub-beam F1. FIG. 10 schematically illustrates the optical mounting described previously in relation with FIGS. 2a, 2b and 2c, and in which a non-linear optic element FRNL is arranged in the optical path of the first sub-beam F1. Said non-linear optic element is chosen in order to enable the generation, on leaving the non-linear optic element, of a first filtered sub-beam containing all the spectral components of the initial first sub-beam, so as to be able to interfere in an optimum manner with the characterized beam Fcar. Generally speaking, it means that the spectrum of the first filtered sub-beam comprises the spectrum of the first non-filtered sub-beam. Such a filtering step is typically based on a third order non-linear process, referred to as "XPW". On account of its third order non-linearity, the XPW process considerably widens the spectrum of the incident reference beam Fref. This thus contributes to limiting significantly potential problems of spectral overlap between the reference beam Fref and the characterized beam Fcar. Moreover, it has been demonstrated that the XPW process acts as a time filter, so that when the incident reference beam is not too far from its Fourier limit, the reference beam filtered on leaving the non-linear optic element may be considered as limited by Fourier transform. In other words, if the spatial-spectral phase of the incident reference beam is relatively flat and said reference beam is spread out by the XPW process, then it may be considered that the filtered reference beam also has a flat spatial-spectral phase. This would thus potentially make it possible to eliminate the step of measuring the spatial-spectral phase of the reference.

A sixth variant of the first embodiment of the invention will now be described, which advantageously makes it possible to take into account potential residual space-time couplings over the reference beam Fref. It should be noted that said sixth variant may be combined with one or more of the first, second, third, fourth and fifth variants described previously, or implemented independently of said first, second, third, fourth and fifth variants.

In the first embodiment of the invention, the assumption is made that the electromagnetic field of the first sub-beam F1 upstream of the surface of the first optic O1 is uniform.

The first optic O1 has however a finite surface, and its diameter may not be chosen too small, without which the signal ratio between the reference beam downstream of the first optic O1 and the characterized beam will be too different from 1 to observe a two-dimensional interference pattern with good contrast. In these conditions, the space-time couplings of the first sub-beam F1 upstream of the first optic O1 are not systematically sufficiently weak so that it may be considered that the electromagnetic field of said first sub-beam F1 is homogeneous over the entire surface of the first optic O1. This approximation may thus induce errors in the electromagnetic field of the characterized beam Fcar finally reconstructed.

Thus, in the sixth variant of the first embodiment of the invention, it is proposed to use the following iterative algorithm:

i. it is assumed that the electromagnetic field of the first sub-beam F1 is effectively homogeneous over the first optic O1, and the electromagnetic field of the reference beam Fref in the measuring plane z1 is deduced therefrom, as described previously;

ii. knowing said field of the reference beam Fref in the measuring plane z1 and using the temporal interferograms S1 measured using the method 10 according to the first embodiment of the invention, a reconstruction of the field of the first sub-beam F1 is deduced in space and in time, or in space and in frequency;

iii. this reconstruction of the field of the first sub-beam F1 comprises the part of the field of the first sub-beam F1 that is reflected on the first optic O1 to produce the field of the reference beam Fref in the measuring plane z1, and which is not necessarily spatially homogeneous at this scale. This reconstruction is used to determine a new field of the reference beam in the measuring plane z1, which this time is no longer based on the hypothesis that the field of the first sub-beam F1 is homogeneous over the entire surface of the first optic O1.

This new field of the reference beam Fref is then reinjected at step ii, and steps ii and iii are repeated in an iterative manner, until converging towards a self-consistent solution such that:

the electromagnetic field of the characterized beam Fcar is reconstructed, and the electromagnetic field of the reference beam in the first measuring plane z1 is the result of the expansion of this field, potentially non-homogeneous even on a restricted surface, by the first optic O1.

The type of iterative algorithm that has been described is more particularly described in the article of T. Oksenhendler et al., "Self-referenced spectral interferometry", Applied Physics B (99), 7-12.

The second embodiment of the invention, referred to as "one-shot mode" will now be described.

Figure 11A:
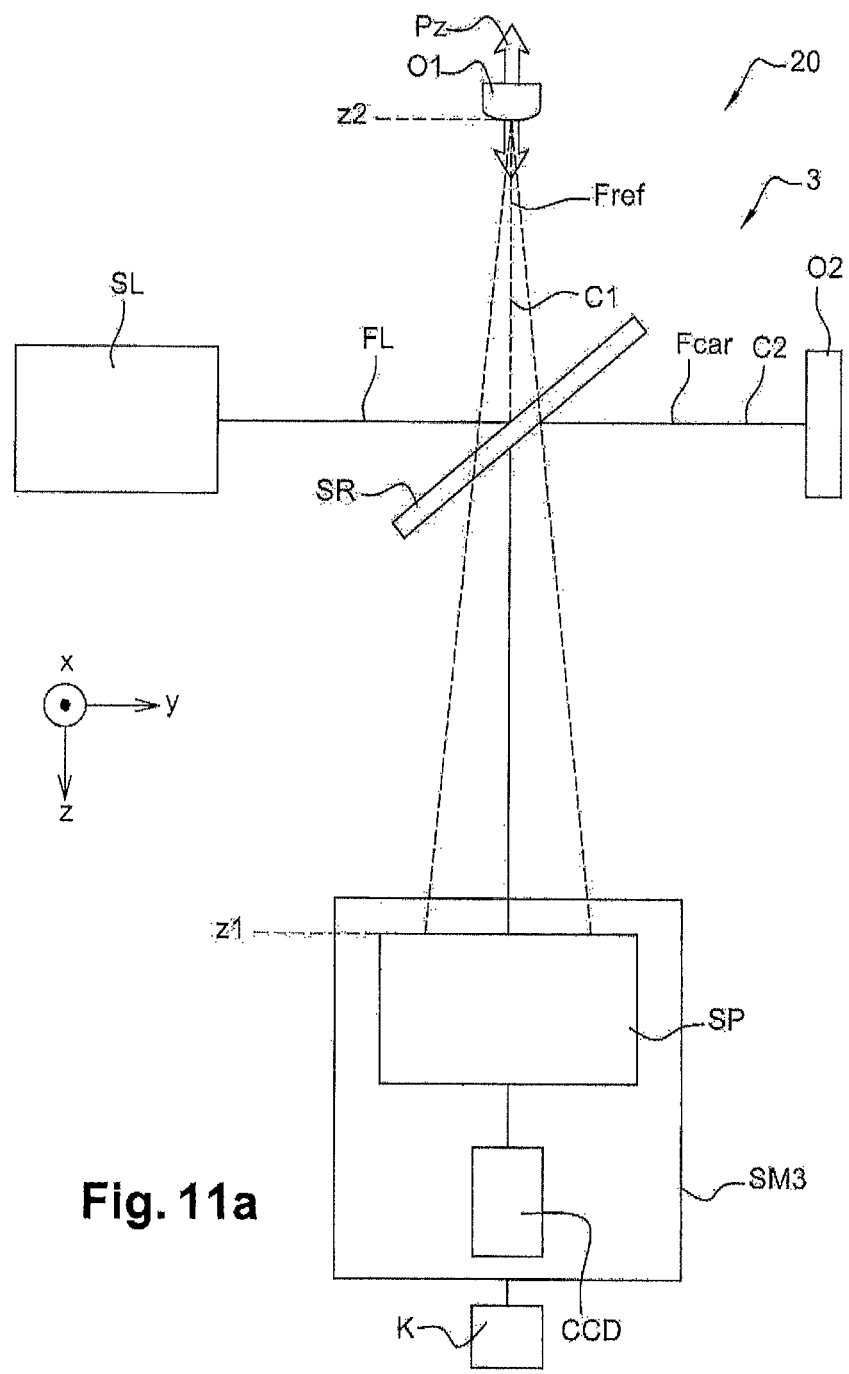
FIG. 11a illustrates a method for characterization of a light beam according to a second embodiment of the invention, using a third device for characterization of a light beam.

FIG. 11a illustrates a method 20 for characterization of a light beam according to a second embodiment of the invention, using a third device 3 for characterization of a light beam.

The third device 3 comprises a measuring system SM3 of a second type, comprising:

a spectrometer SP having an inlet slit Fe;

the sensor CCD of a camera as described previously for the first and second measuring systems SM1 and SM2.

Figure 11B:
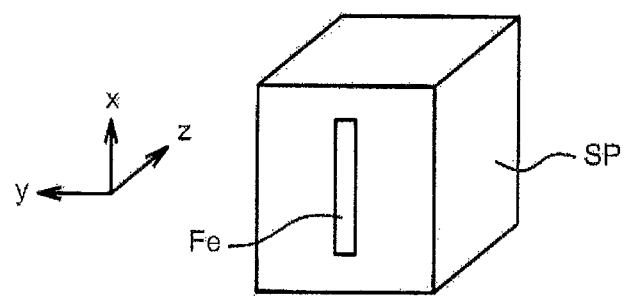
FIG. 11b shows a partial perspective view of the third device for characterization of a light beam.

FIG. 11b shows a partial perspective view of the third device 3 for characterization of a light beam. FIG. 11b thus shows the spectrometer SP having its inlet slit Fe oriented along the direction x.

Figure 11C:
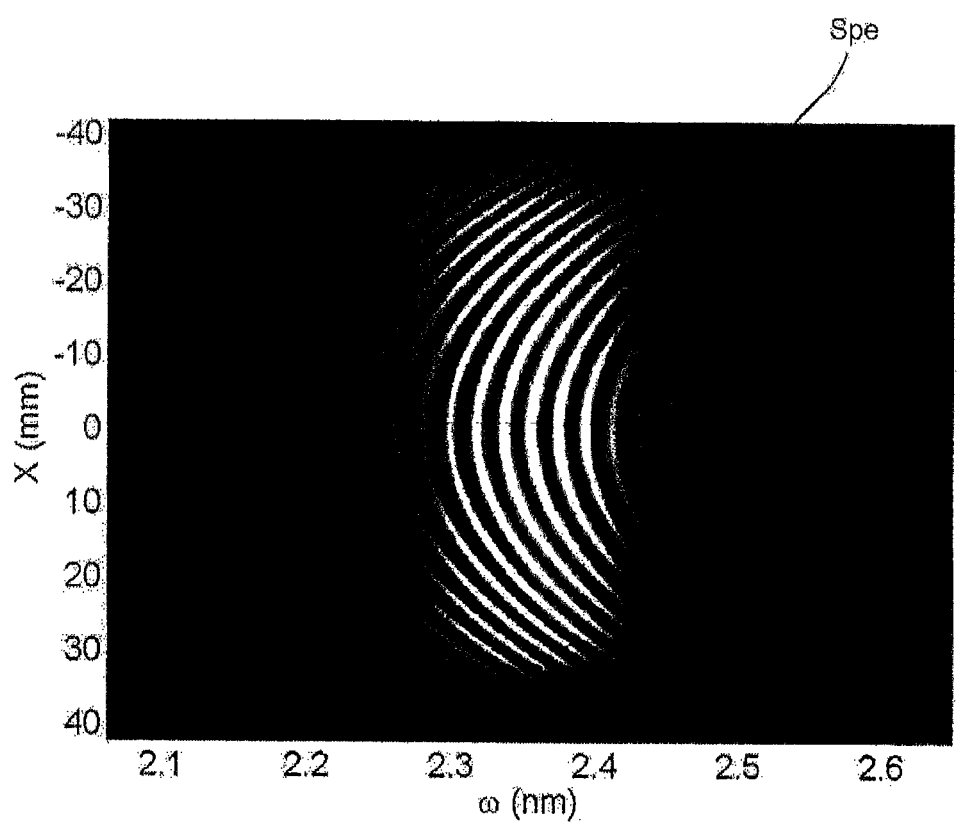
FIG. 11c shows an example of frequency spectrum of a two-dimensional interference pattern for a given time delay, measured experimentally during a step of the method for characterization of a light beam according to the second embodiment of the invention.

FIG. 11c shows an example of frequency spectrum Spe of a two-dimensional interference pattern M1 for a given time delay τ, measured experimentally by the spectrometer SP during a step of the method 20 for characterization of a light beam according to the second embodiment of the invention. The frequency spectrum Spe of FIG. 11c thus comprises a frequency information for the direction x in which the two-dimensional interference pattern M1 has been captured by the slit Fe of the spectrometer SP.

Figure 12A:
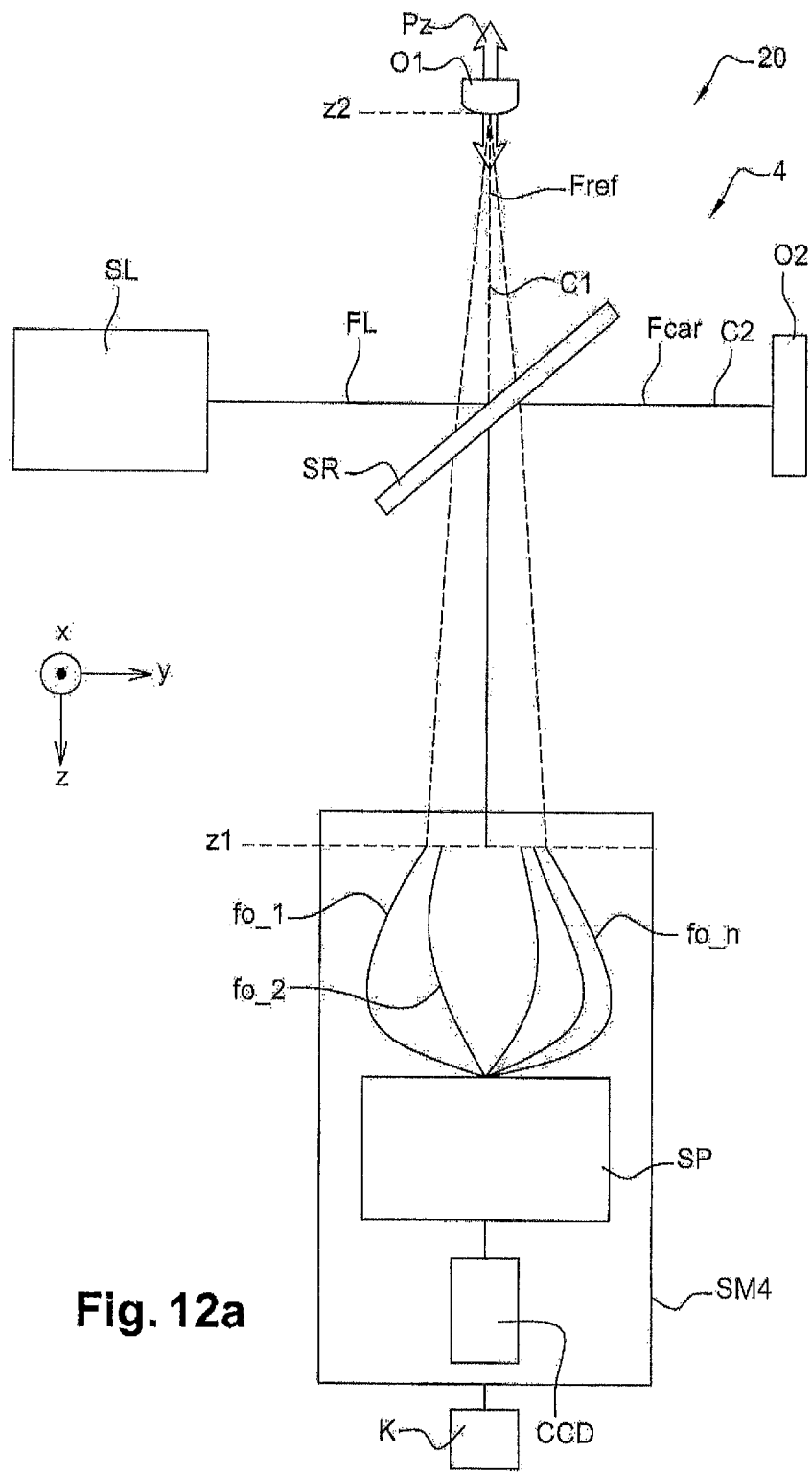
FIG. 12a illustrates an alternative configuration of the method for characterization of a light beam according to the second embodiment of the invention, using a fourth device for characterization of a light beam.

FIG. 12a illustrates an alternative configuration of the method 20 for characterization of a light beam according to the second embodiment of the invention, using a fourth device 4 for characterization of a light beam.

The fourth device 4 comprises a measuring system SM4 of a second type, comprising:

the spectrometer SP having the inlet slit Fe;

the sensor CCD of a camera such as described previously for the first and second measuring systems SM1 and SM2;

a plurality of optical fibres fo_1, fo_2, . . . , fo_n. Said plurality of optical fibres comprises at least two optical fibres. The number of optical fibres of the plurality of optical fibres is less than or equal to the number of vertical pixels of the sensor CCD. This number of vertical pixels may be greater than 500. Preferentially, said plurality of optical fibres comprises a number of optical fibres comprised between 4 and 100.

The input ends of the plurality of optical fibres fo_1, fo_2, . . . , fo_n are arranged in the first plane z1, preferentially in a two-dimensional matrix, that is to say comprising at least two lines and two columns, or alternatively in a matrix-line—comprising a single line and several columns, or in a matrix-column—comprising a single column and several lines. When the matrix is two-dimensional, the signal of the two-dimensional interference pattern M1 may advantageously be sampled along two spatial dimensions in the first plane z1.

Figure 12B:
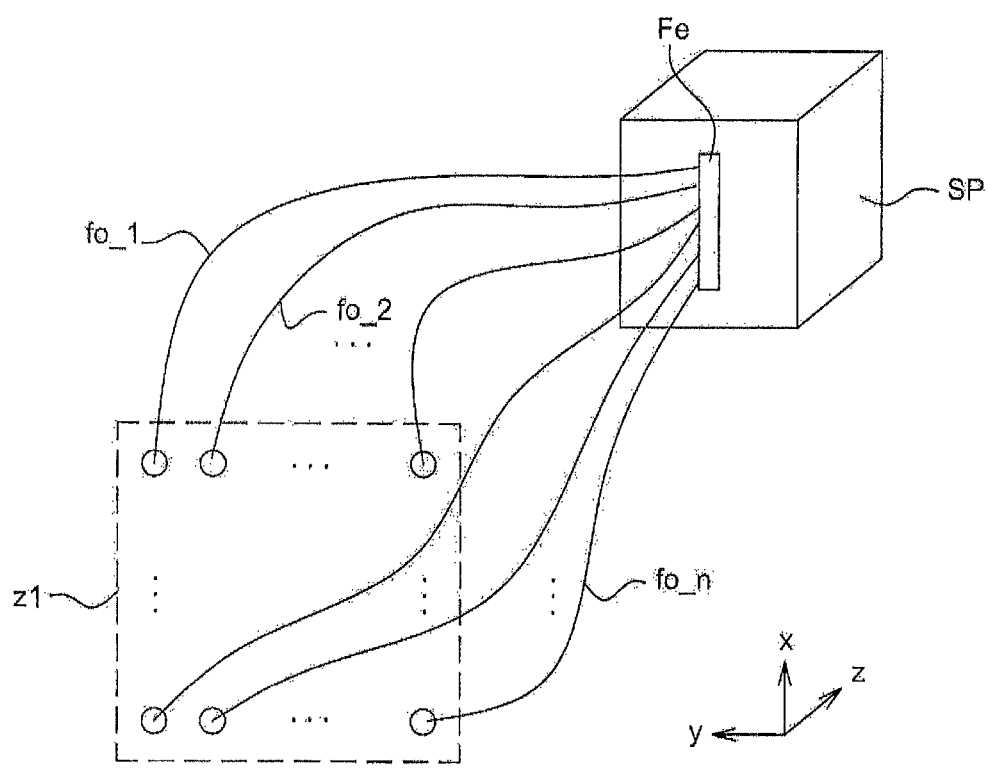
FIG. 12b shows a partial perspective view of the fourth device for characterization of a light beam.

In the example of FIG. 12b, the two-dimensional matrix has a number L>1 of lines and a number C>1 of columns, each line extending parallel to the y axis and each column extending parallel to the x axis, the x and y axes being orthogonal. More generally, each line could extend parallel to a first axis and each column could extend parallel to a second axis separate from the first axis, the first and second axes forming between them a non-zero and non-flat angle. The two-dimensional matrix is preferentially square, that is to say with as many lines as columns, or alternatively rectangular, that is to say with a number L of lines different to the number C of columns.

The output ends of the plurality of optical fibres fo_1, fo_2, . . . , fo_n are then arranged on the inlet slit Fe of the spectrometer SP, advantageously taking care to separate spatially the signals coming from each of the optical fibres.

FIG. 12b shows a partial perspective view of the fourth device 4 for characterization of a light beam. FIG. 12b thus shows the first plane z1 in which the output ends of the plurality of optical fibres fo_1, fo_2, . . . , fo_n are arranged in a two-dimensional matrix, and the inlet slit Fe of the spectrometer SP on which the output ends of said plurality of optical fibres are aligned.

The second variant of the method 10 according to the first embodiment, described previously in relation with FIG. 9, and which advantageously makes it possible to obtain an absolute characterization of the characterized beam Fcar independently of the reference beam Fref is also compatible with the method 20 according to the second embodiment of the invention. In this second variant, the method 20 for characterization of a light beam according to the second mode of the invention thus comprises:

step i), illustrated in FIG. 9, of measuring the spatial-spectral phase $\varphi_{ref}(x,y,\omega)$ of the first sub-beam F1, and the step of measuring the spectral amplitude $A_{ref}(\omega)$ of the first sub-beam F1.

The third variant of the method 10 according to the first embodiment, which has been described previously and which advantageously makes it possible to take into account the curvature of the wave front of the reference beam Fref introduced by the first optic O1, is also compatible with the method 20 according to the second embodiment of the invention. The third variant may then naturally be combined with the second variant, or implemented independently of said second variant.

In the third variant of the method 20 for characterization of a light beam according to the second mode of the invention, thus, after the reflection of the first sub-beam F1 on the first optic O1 and before the recombination of the reference beam Fref with the characterized beam Fcar, the measurement is carried out of the spatial phase at a frequency $\omega_0$ of the reference beam $\varphi_{ref}(x,y,\omega_0)$. Said spatial phase $\varphi_{ref}(x,y,\omega_0)$ is characteristic of the curvature of the wave front of the reference beam Fref introduced by the first optic O1.

The alternative to the third variant, which has been described previously, is also compatible with the second embodiment of the invention.

The fourth variant of the method 10 according to the first embodiment, which has been described previously and which advantageously makes it possible to identify potential points (x,y) of the characterized beam Fcar in the first measuring plane z1 for which the spectra of the characterized beam Fcar and the reference beam Fref do not overlap, or overlap only partially, is also compatible with the second embodiment of the invention. The fourth variant may then naturally be combined with the second variant and/or with the third variant, or implemented independently of said second and third variants.

The fifth variant of the method 10 according to the first embodiment of the invention, which has previously been described in relation with FIG. 10 and which advantageously makes it possible to eliminate, at least partially, said potential points (x,y) of the characterized beam Fcar in the first measuring plane z1 for which the spectra of the characterized beam Fcar and the reference beam Fref do not overlap, or overlap only partially, is also compatible with the method 20 according to the second embodiment of the invention. It should be noted that said fifth variant may then naturally be combined with one or more of the second, third and fourth variants described previously, or implemented independently of said second, third and fourth variants.

The sixth variant of the method 10 according to the first embodiment of the invention is also compatible with the method 20 according to the second embodiment. The iterative algorithm according to the sixth variant, applied to the method 20 according to the second embodiment, is the following:

i. it is assumed that the electromagnetic field of the first sub-beam F1 is effectively homogeneous over the first optic O1, and the electromagnetic field of the reference beam Fref in the measuring plane z1 is deduced therefrom, as described previously;

ii. knowing said field of the reference beam Fref in the measuring plane z1 and using at least one frequency interferogram measured thanks to the method 20 according to the second embodiment of the invention, a reconstruction of the field of the first sub-beam F1 is deduced in space and in time, or in space and in frequency;

iii. this reconstruction of the field of the first sub-beam F1 comprises the part of the field of the first sub-beam F1 that is reflected on the first optic O1 to produce the field of the reference beam Fref in the measuring plane z1, and which is not necessarily spatially homogeneous at this scale. This reconstruction is used to determine a new field of the reference beam in the measuring plane z1, which this time is no longer based on the hypothesis that the field of the first sub-beam F1 is homogeneous over the entire surface of the first optic O1.

In the present description, "frequency interferogram" is taken to mean spatial interference patterns measured as a function of the frequency $\omega$, for a fixed time delay $\tau_0$ between the reference beam Fref and the characterized beam Fcar. The spatial interference patterns measured may be one-dimensional or two-dimensional.

If the spatial interference patterns measured are one-dimensional, the frequency interferogram comprises information along one spatial dimension and along one frequency dimension, thus two-dimensional information.

If the spatial interference patterns measured are two-dimensional, the frequency interferogram comprises information along two spatial dimensions and along one frequency dimension, thus three-dimensional information.

A two-dimensional frequency interferogram may be obtained with a single laser shot, taking advantage of the spatial resolution along the inlet slit of an imaging spectrometer. Obtaining a three-dimensional frequency interferogram requires on the other hand sweeping the laser beam over the inlet slit of the spectrometer, along one of its two spatial dimensions.

This new field of the reference beam Fref is reinjected at step ii, and steps ii and iii are repeated in an iterative manner, until converging towards a self-consistent solution such that:

the electromagnetic field of the characterized beam Fcar is reconstructed, and the electromagnetic field of the reference beam in the first measuring plane z1 is the result of the expansion of this field, potentially non-homogeneous even on a restricted surface, by the first optic O1.

The invention claimed is:

1. A method for characterization of a light beam comprising:

separating the light beam by means of a separator optic into a first sub-beam and a second sub-beam, the first sub-beam taking a first optical path and the second sub-beam taking a second optical path;

propagating the first sub-beam over a first optic and the second sub-beam over a second optic, the first sub-beam having a non-homogeneous electromagnetic field over an entire surface of the first optic, said first sub-beam forming a reference beam upon leaving the first optic and said second sub-beam forming a characterized beam upon leaving the second optic, said first and second optics being, thanks to a controller, respectively arranged in the first and second optical paths so that the reference beam and the characterized beam are separated by a time delay $\tau$;

recombining the reference beam and the characterized beam by means of a recombiner optic in such a way that the reference and characterized beams spatially interfere and form a two-dimensional interference pattern, the two-dimensional interference pattern extending along a first plane;

measuring a frequency spectrum of at least one part of the two-dimensional interference pattern by means of a measuring system, the measuring system comprising a spectrometer having an inlet slit extending along a first spatial direction of the first plane;

calculating the Fourier transform in the time domain of at least one spatial point of the frequency spectrum, said Fourier transform in the time domain having a time central peak and first and second time side peaks;

calculating the Fourier transform in the frequency domain by means of a calculator for one of said first and second time side peaks;

calculating, by means of the calculator, a relative spectral amplitude $A_R(\omega)$ and a relative spatial-spectral phase $\varphi_R(x,y,\omega)$ for said Fourier transform in the frequency domain.

2. The method according to claim 1, further comprising:
a step i) according to which the electromagnetic field of the reference beam in the first measuring plane is calculated while assuming that the electromagnetic field of the first sub-beam is homogeneous in the second plane of the first optic;

a step ii) according to which a reconstruction of the electromagnetic field of the first sub-beam in the second plane of the first optic is calculated, from the electromagnetic field of the reference beam in the first measuring plane, calculated previously, and a frequency interferogram;

a step iii) according to which the electromagnetic field of the reference beam in the first measuring plane is calculated using the reconstruction of the electromagnetic field of the first sub-beam in the second plane of the first optic, calculated previously.

3. The method according to claim 2, wherein step ii) and step iii) are iterated until they converge towards a self-consistent solution such that:
the electromagnetic field of the characterized beam is reconstructed, and
the electromagnetic field of the reference beam in the first measuring plane is the result of the expansion of said electromagnetic field of the reference beam by the first optic.

4. The method according to claim 1, wherein measuring the frequency spectrum of at least one part of the two-dimensional interference pattern comprises the following sub-steps:
arranging the spectrometer of the measuring system so that the inlet slit of the spectrometer is adapted to receive said at least one part of the two-dimensional interference pattern, said at least one part extending along the first spatial dimension of the first plane;
measuring, thanks to the spectrometer, the frequency spectrum of said at least one part of the two-dimensional interference pattern extending along the first spatial dimension of the first plane.

5. The method according to claim 1, wherein measuring the frequency spectrum of at least one part of the two-dimensional interference pattern comprises the following sub-steps:
the measuring system comprising a plurality of optical fibres, arranging input ends of said plurality of optical fibres in the first plane according to a two-dimensional matrix, so as to be able to sample the two-dimensional interference pattern along a first spatial direction of the first plane and along a second spatial direction of the first plane;
arranging output ends of said plurality of optical fibres on the inlet slit of the spectrometer of the measuring system;
measuring, thanks to the spectrometer of the measuring system, the frequency spectrum of the sampling of the two-dimensional interference pattern along the first and second spatial directions of the first plane.

6. The method according to claim 1, further comprising:
measuring the spatial phase at a frequency $\omega_0$ of the reference beam $\varphi_{ref}(x,y,\omega_0)$, said spatial phase $\varphi_{ref}(x,y,\omega_0)$ being characteristic of a curvature of the wave front of the reference beam introduced by the first optic, then subtracting the spatial-spectral phase $$\frac{\omega}{\omega_0} \varphi_{ref}(x, y, \omega_0)$$

from the relative spatial-spectral phase $\varphi_R(x,y,\omega)$, to obtain the corrected relative spatial-spectral phase of the characterized beam.

7. The method according to claim 1, further comprising:
measuring the spatial-spectral phase of the first sub-beam $\varphi_{ref}(x,y,\omega)$, corresponding to a reference spatial-spectral phase,
then subtracting said reference spatial-spectral phase $\varphi_{ref}(x,y,\omega)$ from the relative spatial-spectral phase $\varphi_R(x,y,\omega)$, to obtain the absolute spatial-spectral phase of the characterized beam $\varphi_{abs}(x,y,\omega)$.

8. The method according to claim 1, further comprising:
measuring the spatial phase at a frequency $\omega_0$ of the reference beam $\varphi_{ref}(x,y,\omega_0)$, said spatial phase $\varphi_{ref}(x,y,\omega_0)$ being characteristic of a curvature of the wave front of the reference beam introduced by the first optic,
measuring the spatial-spectral phase of the first sub-beam $\varphi_{ref}(x,y,\omega)$, corresponding to a reference spatial-spectral phase,
then subtracting said reference spatial-spectral phase $\varphi_{ref}(x,y,\omega)$ and spatial-spectral phase $$\frac{\omega}{\omega_0} \varphi_{ref}(x, y, \omega_0)$$

from the relative spatial-spectral phase $\varphi_R(x,y,\omega)$, to obtain the corrected absolute spatial-spectral phase of the characterized beam.

9. A device for characterization of a light beam, comprising:
a separator optic to separate the light beam into a first sub-beam and a second sub-beam, the separator optic defining a first optical path for the first sub-beam and a second optical path for the second sub-beam;
a first optic arranged in the first optical path so that the first sub-beam is propagated over the first optic, said first sub-beam forming a reference beam upon leaving the first optic, the first optic having a first radius of curvature so that the reference beam has wave fronts of a first type, the first sub-beam having a non-homogeneous electromagnetic field over an entire surface of the first optic;
a second optic arranged in the second optical path so that the second sub-beam is propagated over the second optic, said second sub-beam forming a characterized beam upon leaving the second optic, the second optic having a second radius of curvature different to the first radius of curvature so that the characterized beam has wave fronts of a second type, different to the first type;

a controller to control a time delay $\tau$ between the reference beam and the characterized beam;

a recombiner optic to recombine the reference beam and of the characterized beam in such a way that the reference and characterized beams spatially interfere and form a two-dimensional interference pattern, the two-dimensional interference pattern extending along a first plane;

a measuring system to measure a frequency spectrum of at least one part of the two-dimensional interference pattern, to obtain, from the at least one part of the two-dimensional interference pattern, a temporal information or a frequency information, the measuring system comprising a spectrometer having an inlet slit extending along a first spatial direction of the first plane;

a calculator to calculate the Fourier transform in the time domain of at least one spatial point of the frequency spectrum, said Fourier transform in the time domain having a time central peak and first and second time side peaks, to calculate the Fourier transform in the frequency domain for one of said first and second time side peaks, and to calculate a relative spectral amplitude $A_R(\omega)$ and a relative spatial-spectral phase $\varphi_R(x, y, \omega)$ for said Fourier transform in the frequency domain.

10. The device according to claim 9, wherein the separator optic and the recombiner optic form a single and same optic ensuring the separation of the light beam on the one hand, and the recombination of the reference beam and the characterized beam on the other hand.

\* \* \* \* \*